United States Patent [19]
Smith et al.

[11] 3,943,372
[45] Mar. 9, 1976

[54] COMBINED CYCLE ELECTRIC POWER PLANT AND A GAS TURBINE HAVING AN IMPROVED STARTUP CONTROL ESPECIALLY USEFUL IN A BACKUP CONTROL SYSTEM

[75] Inventors: Jack R. Smith, Pittsburgh; Terry J. Reed, North Huntingdon, both of Pa.

[73] Assignee: Westinghouse Electric Corporation, Pittsburgh, Pa.

[22] Filed: Aug. 8, 1974

[21] Appl. No.: 495,700

[52] U.S. Cl. ...... 290/40 R; 60/39.18 B; 60/39.28 R
[51] Int. Cl.² F01D 17/02; G05B 15/00; G06F 15/06
[58] Field of Search.......... 290/2, 4, 40; 60/39.18 B, 60/39.14, 59 T, 664, 660, 665, 39.28 R, 662, 39.28; 415/17

[56] References Cited
UNITED STATES PATENTS

| | | |
|---|---|---|
| 3,762,162 | 10/1973 | Miura et al. .......................... 60/49 |
| 3,820,323 | 6/1974 | Burnell et al. ................. 60/39.28 R |
| 3,866,109 | 2/1975 | Reed et al............................. 322/15 |

*Primary Examiner*—James R. Scott
*Assistant Examiner*—John W. Redman
*Attorney, Agent, or Firm*—E. F. Possessky

[57] ABSTRACT

A combined cycle electric power plant includes gas and steam turbines and steam generators and a digital/analog control system. The control system includes an automatic control and a backup control which are interfaced to operate the gas turbine throttle valve for speed and load control purposes and to provide for manual/auto transfers. The backup control includes a startup control which functions on the basis of a feedforward fuel schedule ramp function. Between ignition speed and 78% synchronous speed, the ramp function is a linear function of fuel demand versus speed with a predetermined slope. From 78% of synchronous speed to idle speed, the ramp function is a linear function with a lesser slope.

10 Claims, 26 Drawing Figures

FIG. 1.

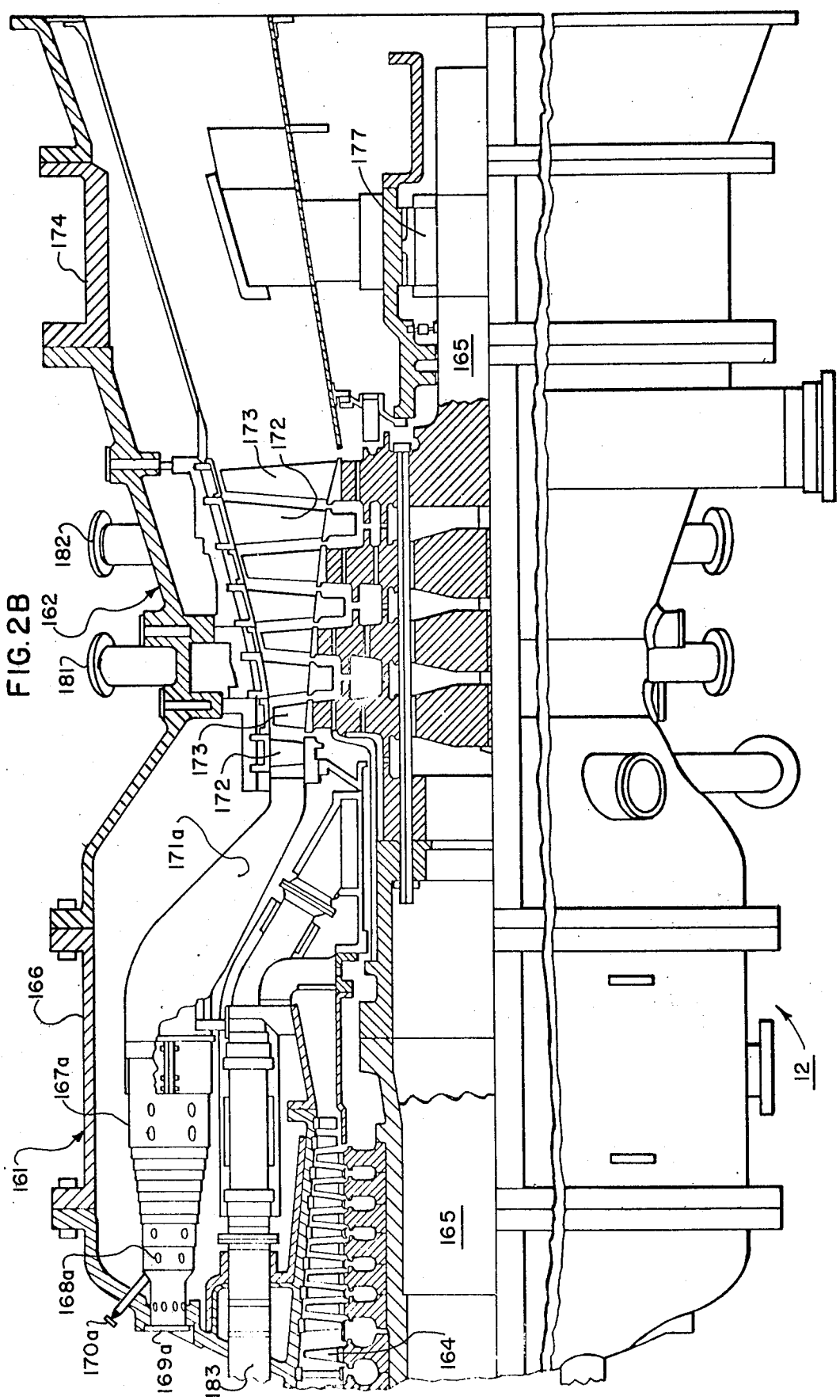

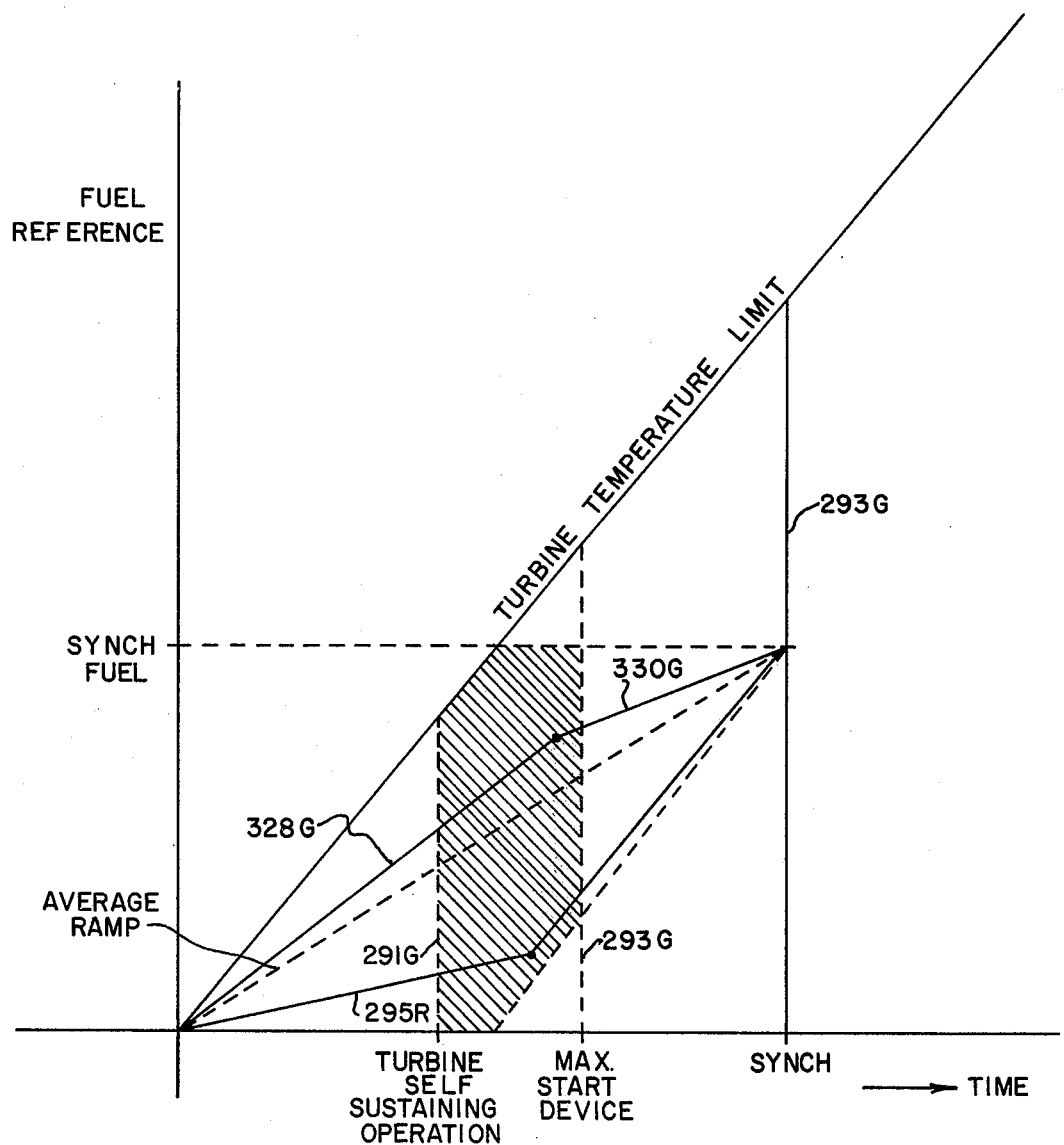

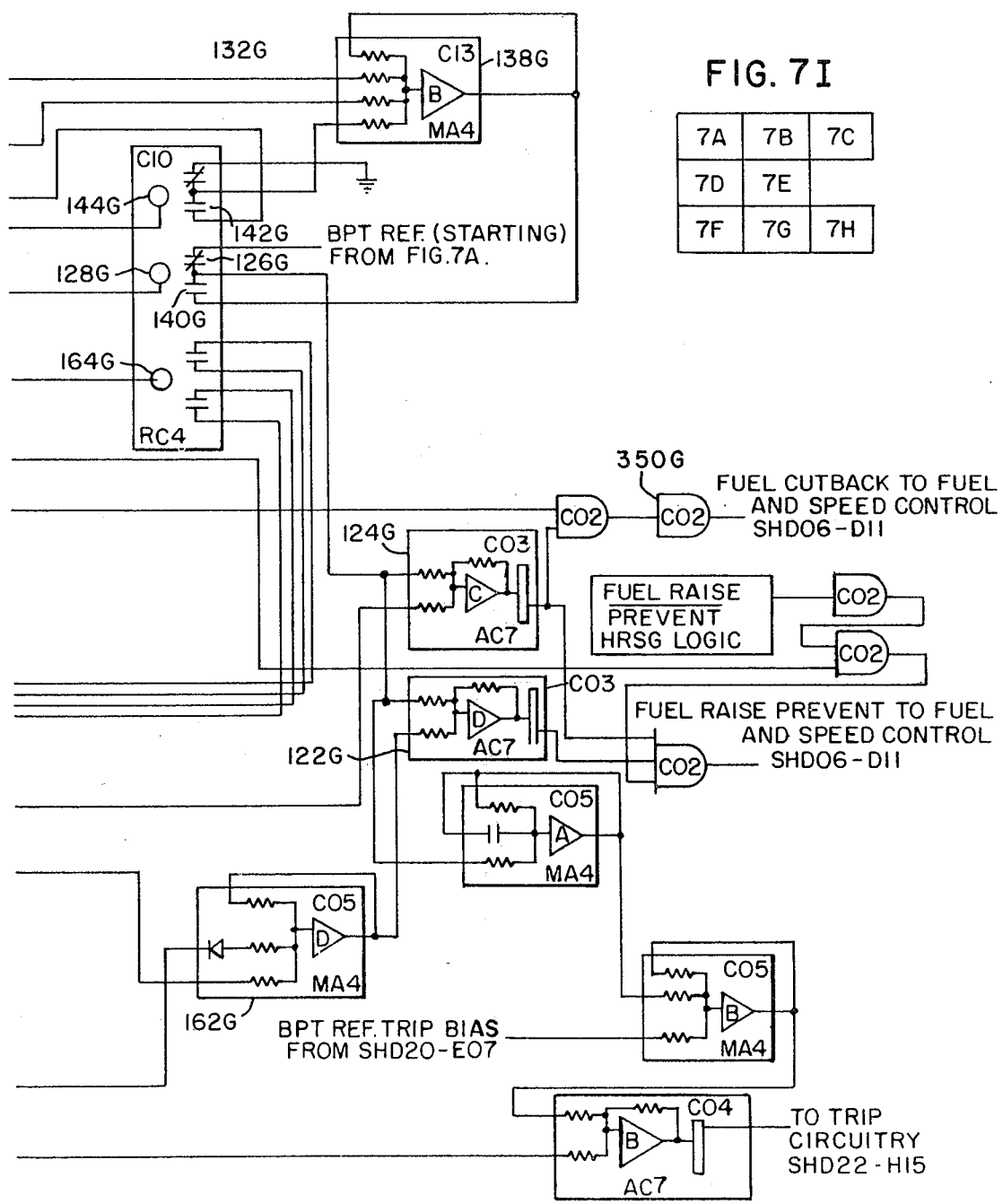

COMBINED CYCLE ELECTRIC POWER PLANT AND A GAS TURBINE HAVING AN IMPROVED STARTUP CONTROL ESPECIALLY USEFUL IN A BACKUP CONTROL SYSTEM

CROSS REFERENCE TO RELATED APPLICATIONS

Reference is made to the following patent applications:

1. Ser. No. 399,790, filed on Sept. 21, 1973 by L. F. Martz, R. W. Kiscaden and R. Uram, entitled "An Improved Gas Turbine And Steam Turbine Combined Cycle Electric Power Generating Plant Having A Coordinated And Hybridized Control System And An Improved Factory Based Method For Making And Testing Combined Cycle And Other Power Plants And Control Systems Therefor," assigned to the present assignee and hereby incorporated by reference.

2. Ser. No. 319,114, filed by T. Giras and J. Reuther on Dec. 29, 1972 as a continuation of an earlier filed application Ser. No. 082,470, entitled "An Improved System And Method For Operating Industrial Gas Turbine Apparatus And Gas Turbine Electric Power Plants Preferably With A Digital Computer Control System" and assigned to the present assignee, and related cases referred to therein.

3. Ser. No. 371,625, filed on June 20, 1973 by R. Yannone and R. A. Shields, entitled "Gas Turbine Power Plant Control Apparatus Having A Multiple Backup Control System," and assigned to the present assignee, and related cases referred to therein.

4. Ser. No. 495,765, filed concurrently herewith by Lyle F. Martz and Richard J. Plotnick, entitled "Combined Cycle Electric Power Plant Having A Control System Which Enables Dry Steam Generator Operation During Gas Turbine Operation," assigned to the present assignee and hereby incorporated by reference.

BACKGROUND OF THE INVENTION

The present invention relates to combined cycle electric power plants and more particularly to improved gas turbine startup controls especially useful in the operation of backup control systems for gas turbines in combined cycle electric power plants.

A gas turbine that is used for electric power generation is typically started with a diesel engine or other power assist device. When the turbine reaches the ignition speed which may be 20% of synchronous speed, lightoff occurs and the diesel continues to drive the turbine until it reaches a self-sustaining speed which may be 60% of synchronous speed. Thereafter, the turbine is accelerated to synchronous speed and synchronization is performed under automatic or operator control. In combined cycle and other electric power plant applications, it is important that startup occur rapidly without unnecessary foreshortening of turbine life and that the plant availability be highly rated because of the reliability with which turbine startup can be expected to occur.

Various types of startup control have been employed for electric power gas turbines with various types of hardware technologies including relay-pneumatic, analog electropneumatic, and digital/analog electropneumatic. With respect to the different types of controls, it has been common to start a gas turbine with a temperature control loop, i.e. the turbine is caused to accelerate to synchronous speed at a rate allowed by an exhaust temperature limit and in some cases with a surge limit override. Faster startups are permitted on cold days with temperature limit startup control.

In a digital computer/analog hybrid control set forth in the previously referenced patent application Ser. No. 082,470, fixed time gas turbine startup is disclosed in which a speed reference is digitally generated and applied to a speed control loop so that startup occurs in a fixed time even though day-to-day ambient temperature variations occur. Another electropneumatic startup control is disclosed in Ser. No. 371,635 assigned to the present assignee.

In U.S. Loft Pat. No. 3,520,133, an automatic startup control is disclosed in which analog electronic and pneumatic hardware is employed and in which a feedforward startup control is employed with temperature and acceleration limit control. In the Loft patent, the startup control is a part of the primary control system.

In much of the prior art, little consideration is given to backup startup controls for the primary and usually automatic control loop. Often this is because of the presence of multiple control loops in the automatic controller itself which serve to some degree as backup for each other especially when the control loops are embodied in relatively independent hardware paths as in an analog electropneumatic control. In digital computer/analog hybrid controls, the need for a backup control for startup and other control purposes can be greater because the whole automatic control may be put out of service with the failure of the computer. Thus, in copending and coassigned patent application Ser. No. 476,182 entitled "Local Maintenance Controller For Gas Turbine Power Plants Having A Primary Control System" filed by R. A. Yannone et al on June 4, 1974, there is a disclosed a backup control for a turbine control system which employs a general purpose digital computer.

In various power plant applications, it is generally desirable to provide a simple yet reliable control for gas turbine startup operation. More particularly, in various electric power plants and especially in combined cycle power plants, it is desirable to provide a plant control system with a simple yet reliable gas turbine startup control which can serve as a backup startup control for the automatic controller in the event of a failure of the automatic controller or which can serve to provide plant startup or turbine startup upon operator selection of the manual mode.

The description of prior art herein is made on good faith and no representation is made that any prior art considered is the best pertaining prior art nor that the interpretation placed on it is unrebuttable.

SUMMARY OF THE INVENTION

A gas turbine or combined cycle electric power plant includes turbine and generator apparatus and a control system preferably having an automatic primary control and a backup control which are coupled to a turbine valve control to control the fuel flow and the gas turbine operating level. The backup control includes a feedforward startup control which generates a fuel schedule signal preferably in accordance with two different ramps applicable over different parts of the startup speed range and preferably when transfer is made to backup control by automatic or operator selection.

BRIEF DESCRIPTION OF THE DRAWINGS

FIGS. 2A and 2B illustrate a gas turbine structure which can be employed in the plant of FIG. 1;

FIGS. 6A through 6H show a more detailed functional diagram of the backup startup control and FIG. 6I shows how these Figures are tied together;

DESCRIPTION OF THE PREFERRED EMBODIMENT

A. General Plant Description

Figure 1:
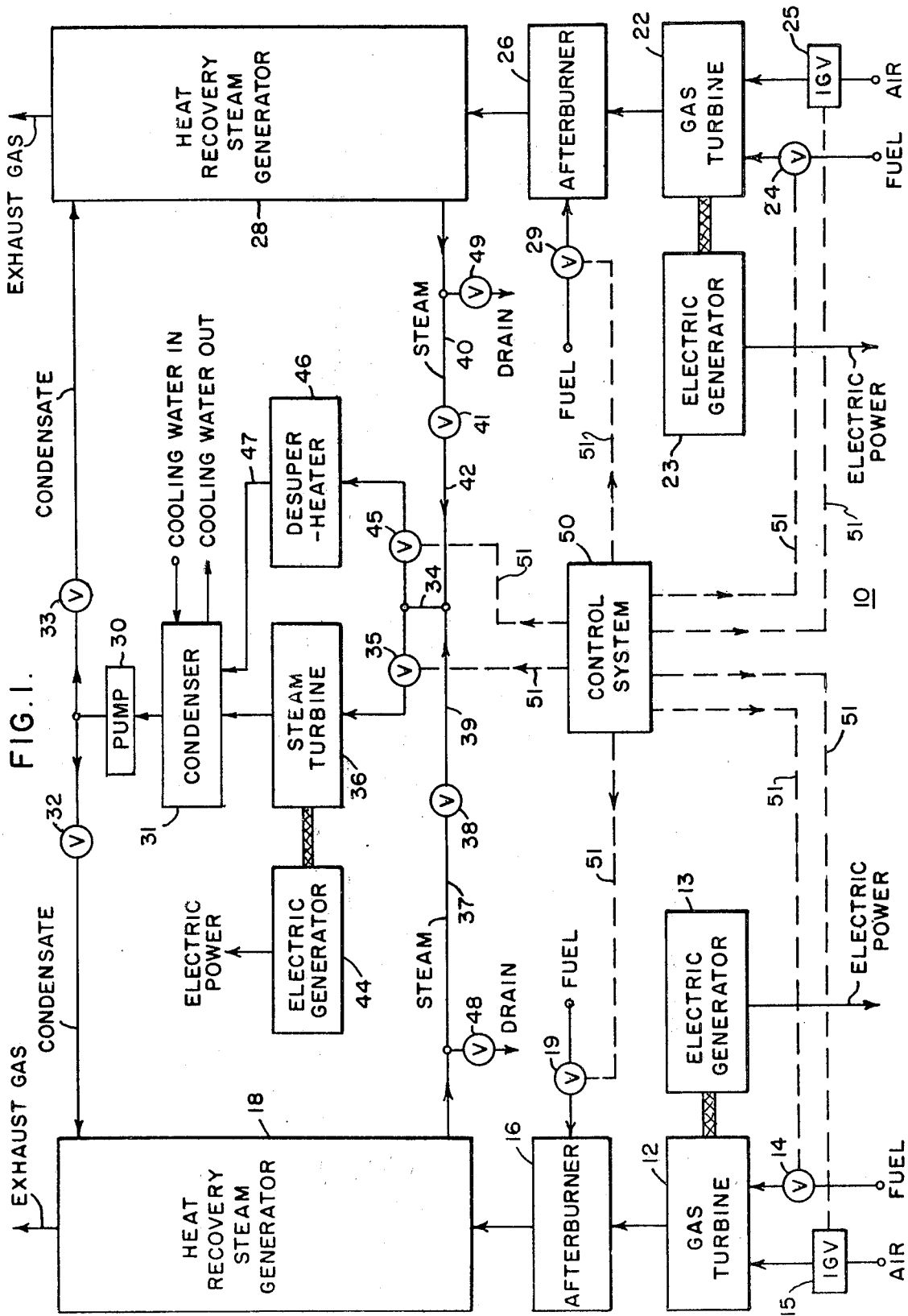
FIG. 1 shows a schematic view of a combined cyle electric power plant in which there is employed a gas turbine in accordance with the principles of the invention.

Referring to FIG. 1 of the drawings, there is shown a functional block diagram of a representative embodiment of a combined cycle electric power generating plant constructed in accordance with the present invention. Reference numeral 10 is used to identify the combined cycle plant as a whole. As such, the plant 10 includes a first gas turbine 12 (sometimes referred to as "gas turbine No. 1") which drives a first electric generator 13. Fuel is supplied to the gas turbine 12 by way of a fuel control valve or throttle valve 14. Air enters the gas turbine 12 by way of a variable inlet guide vane mechanism 15 which controls the degree of opening of the turbine air intake and which is used to adjust air flow during the startup phase and to increase part load efficiency. The fuel supplied by the throttle valve 14 is burned in the gas turbine 12 and the resulting high temperature exhaust gas is passed through an afterburner 16 and a heat recovery steam generator 18 and is thereafter exhausted into the atmosphere.

Heat recovery steam generator 18 (sometimes referred to as "heat recovery steam generator No. 1") includes therein various sets of boiler tubes which are heated to a relatively high temperature by the gas turbine exhaust gas passing through the steam generator 18. Afterburner 16 includes a burner mechanism for further increasing the temperature of the gas turbine exhaust gas before it enters the steam generator 18. Fuel is supplied to the burner mechanism in the afterburner 16 by way of a fuel control valve or throttle valve 19. The primary heat source for the steam generator 18 is the gas turbine 12, the afterburner 16 being in the nature of a supplemental heat source for providing supplemental heat when needed. In terms of typical fuel usage, approximately 80% of the fuel is used in the gas turbine 12 and 20% is used in the afterburner 16.

The combined cycle plant 10 further includes a second gas turbine 22 (sometimes referred to as "gas turbine No. 2") which drives a second electric generator 23. Fuel is supplied to the gas turbine 22 by way of a fuel control valve or throttle valve 24. Air enters the gas turbine 22 by way of a variable inlet guide vane mechanism 25 which is used to adjust air flow during turbine startup and to increase part load efficiency. The fuel supplied by throttle valve 24 is burned in the gas turbine 22 and the resulting high temperature exhaust gas is passed through an afterburner 26 and a heat recovery steam generator 28 and is thereafter exhausted into the atmosphere.

Heat recovery steam generator 28 (sometimes referred to as "heat recovery steam generator No. 2") includes various sets of boiler tubes which are heated to a relatively high temperature by the gas turbine exhaust gas passing through the steam generator 28. Afterburner 26 includes a burner mechanism for further increasing the temperature of the gas turbine exhaust gas before it enters the steam generator 28. Fuel is supplied to the burner mechanism in the afterburner 26 by way of a fuel control valve or throttle valve 29. The primary heat source for the steam generator 28 is the gas turbine 22, the afterburner 26 being in the nature of a supplemental heat source for providing supplemental heating when needed. In terms of typical total fuel consumption, approximately 80% of the fuel is used in the gas turbine 22 and 20% is used in the afterburner 26.

A condensate pump 30 pumps water or condensate from a steam condenser 31 to both of the steam generators 18 and 28, the condensate flowing to the first steam generator 18 by way of a condensate flow control valve 32 and to the second steam generator 28 by way of a condensate flow control valve 33. Such condensate flows through the boiler tubes in each of the steam generators 18 and 28 and is converted into superheated steam. The superheated steam from both of the steam generators 18 and 28 is supplied by way of a common header or steam pipe 34 and a steam throttle valve or control valve 35 to a steam turbine 36 for purposes of driving such steam turbine 36. The steam from the first steam generator 18 flows to the header 34 by way of a steam pipe 37, an isolation valve 38 and a steam pipe 39, while steam from the second steam generator 28 flows to the header 34 by way of a steam pipe 40, an isolation valve 41 and a steam pipe 42.

The spent steam leaving steam turbine 36 is passed to the condenser 31 wherein it is condensed or converted back into condensate. Such condensate is thereafter pumped back into the steam generators 18 and 28 to make more steam. Steam turbine 36 drives a third electric generator 44.

A steam bypass path is provided for use at appropriate times for diverting desired amounts of steam around the steam turbine 36. This steam bypass path includes a steam turbine bypass valve 45 and a desuperheater 46, the output side of the latter being connected to the condenser 31 by way of a pipe 47. A drain valve 48 is provided for the first steam generator 18, while a drain valve 49 is provided for the second steam generator 28.

The operation of the combined cycle electric power generator plant 10 is controlled by a control system 50, typical control signal lines 51 being shown in a broken line manner. As will be seen, the control system 50 offers a choice of four different control operating levels providing four different degrees of automation. From highest to lowest in terms of the degree of automation, these control operating levels are: (1) plant coordinated control; (2) operator automatic control; (3) operator analog control; and (4) manual control. The control system 50 includes an analog control system which is constructed to provide complete and safe operation of the total plant 10 or any part thereof. The control system 50 also includes a digital computer that provides a real-time digital control system that works in conjunction with the analog control system at the higher two levels of control to coordinate and direct the operation of the analog control system. Failure of the digital control computer results in no loss of power generation because the analog control system provides for complete operation of the plant 10.

When operating at the highest level of control, namely, at the plant coordinated control level, the control system 50, among other things, automatically coordinates the settings of the fuel valves 14, 19, 24 and 29, the inlet guide vanes 15 and 25 and the steam turbine throttle and bypass valves 35 and 45 to provide maximum plant efficiency under static load conditions and optimum performance during dynamic or changing load conditions.

The control system 50 also enables a coordinated automatic startup or shutdown of the plant 10 such that the plant 10 can be brought from a hot standby condition to a power generating condition or vice versa in a quick, efficient and completely automatic manner. For example, the entire plant 10 can be started and brought to full load from a hot standby condition in approximately 60 minutes time by having the plant operator simply dial in the desired load setting and push a master plant start button.

As an indication of the flexibility and reliability of the power generating plant 10, it is noted that the plant 10 can be operated in any one of the following configurations: (1) using one steam turbine and two gas turbines; (2) using one steam turbine and one gas turbine; (3) using two gas turbines only; and (4) using one gas turbine only. The steam turbine 36 will, of course, not operate by itself, it being necessary to use at least one of the gas turbines 12 and 22 in order to use the steam turbine 36. In order to obtain the benefits of combined cycle operation, it is, of course, necessary to use the steam turbine 36 and at least one of the gas turbines 12 and 22. When one of the gas turbines, for example the gas turbine 12, is not being used or is shut down for maintenance purposes, then its associated steam generator 18 can be removed from the system by closing its condensate flow valve 32 and its steam isolation valve 38. When, on the other hand, the steam turbine 36 is not being used or is shut down for maintenance purposes, the steam generated by the steam generators 18 and 28 can be bypassed to the condenser 31 by way of steam bypass valve 45 and the desuperheater 46. As an alternative, when the steam turbine 36 is not being used, either one or both of the steam generators 18 and 28 can be drained and vented by the appropriate setting of condensate valves 32 and 33, steam isolation valves 38 and 41 and drain valves 48 and 49. In other words, each of the steam generators 18 and 28 is constructed so that its respective gas turbine can be operated with the steam generator in a dry condition.

The combined cycle plant 10 affords a high degree of reliability in that failure of any one of the major apparatus components will not reduce total plant power generation capacity by more than 50%. In this regard and by way of example only, a combined cycle plant 10 has been developed having a nominal maximum power generating capacity of 260 megawatts. In such plant, each of the gas turbines 12 and 22 is capable of producing a maximum of approximately 80 megawatts of electrical power under ISO conditions (59° Fahrenheit at sea level) and the steam turbine 36 is capable of producing a maximum of approximately 100 megawatts of electrical power. Thus, loss of any one of the turbines 12, 22 and 36, for example, would not reduce total plant capacity by as much as 50%.

It is noted in passing that the functional block diagram of FIG. 1 has been simplified in some respects relative to the actual plant apparatus to be described hereinafter, this simplification being made to facilitate an initial overall understanding of the combined cycle plant 10. A major simplification in FIG. 1 concerns the fuel valves 14, 19, 24, and 29. As will be seen in the actual embodiment of the combined cycle plant described herein, provision is made for operating the gas turbines 12 and 22 and the afterburners 16 and 26 on either of two different kinds of fuel, namely, either natural gas or distillate type fuel oil. As a consequence, each of the gas turbines 12 and 22 and each of the afterburners 16 and 26 is actually provided with two fuel throttle valves, one for natural gas and the other for fuel oil. Also, various other valves and devices employed in the actual fuel supply systems have been omitted from FIG. 1 for the sake of simplicity. Other simplifications employed in FIG. 1 are of a similar character.

B. Gas Turbine Mechanical Structure

Figure 2A:
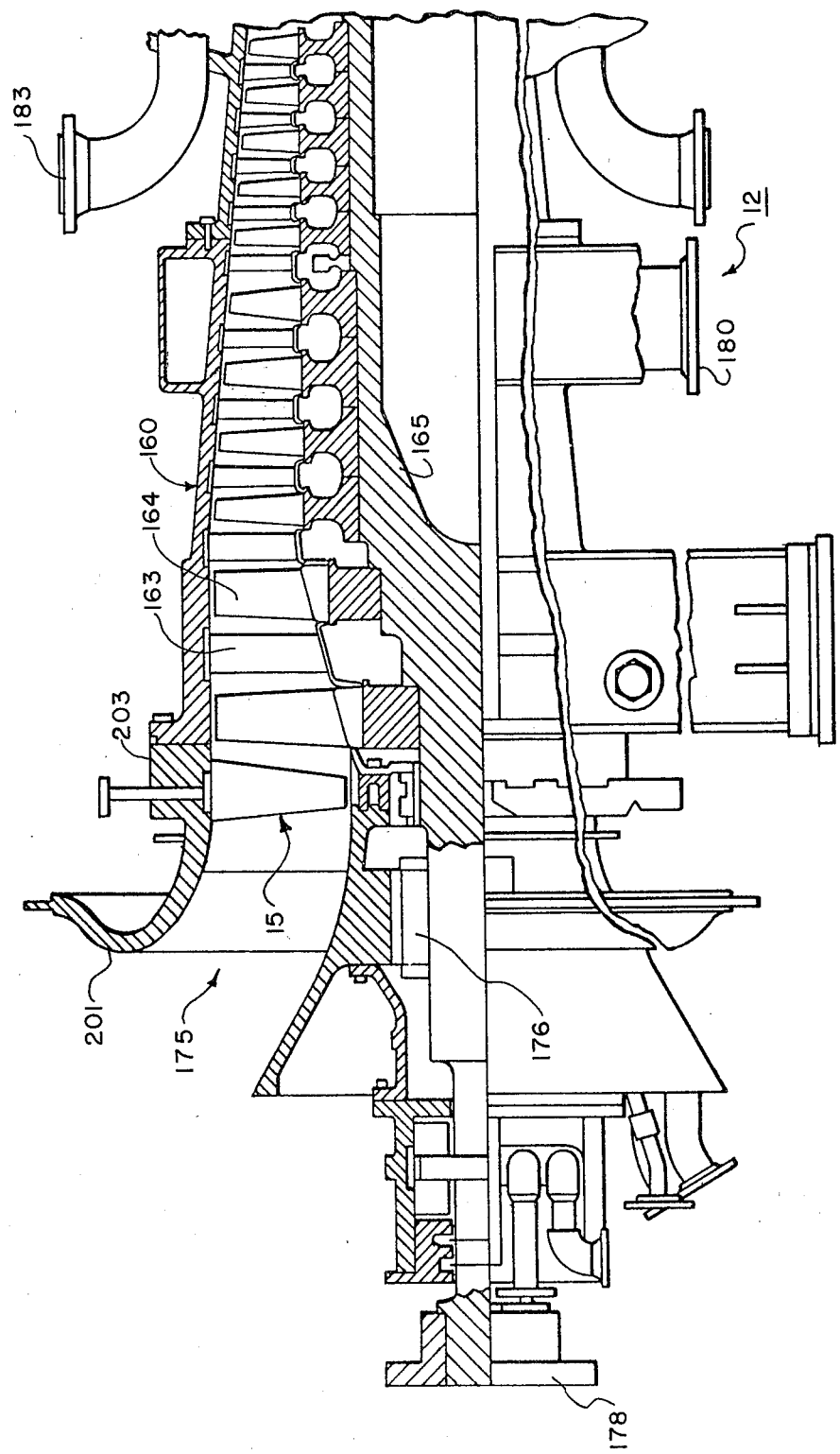

Referring now to FIGS. 2A and 2B, there is shown a longitudinal, partially cross-sectional, elevational view of the No. 1 gas turbine 12. FIG. 2A shows the left-hand half of the view and FIG. 2B shows the right-hand half of the view. The No. 2 gas turbine 22 is of this same construction and whatever is said concerning the construction of the No. 1 gas turbine 12 also applies to the No. 2 gas turbine 22. With this in mind, the gas turbine 12 is a W-501 gas turbine manufactured by Westinghouse Electric Corporation, Gas Turbine Systems Division, Lester, Pa. It is of the simple open cycle type and employs a single-shaft twobearing construction in which no bearings are located in a high pressure, high temperature zone. It is constructed for operation at a rated speed of 3,600 r.p.m. and is capable of driving an electric generator for producing in excess of 80 megawatts of electrical power. It includes an axial flow air compressor section 160, a combustion section 161 and a turbine section 162. The compressor section or compressor 160 is comprised of interspersed sets of stationary blades 163 and rotary blades 164, the latter being located on a rotor structure 165 which extends substantially the entire length of the gas turbine 12.

The combustion section 161 includes a combustor housing or combustor shell 166 which receives the compressed air from the compressor 160. Located in the combustor shell 166 is a set of 16 combustion chambers or combustors, one of which is indicated at 167a. These combustors 167a–167p are arranged in an evenly spaced concentric manner around the longitudinal center axis of the gas turbine 12. Considering in detail only the combustor 167a, compressed air enters the interior thereof by multiple ports 168a. Fuel enters the combustor 167a by way of a fuel nozzle 169a, a spark plug 170 a serving to provide for the initial ignition of the fuel. This fuel is burned in the combustor 167a and the resulting high temperature, high pressure gas is supplied by way of a combustor outlet duct 171a to the inlet of the turbine section 162.

The turbine section 162 is a four stage turbine having interspersed sets of stationary blades 172 and rotary blades 173, the latter being located on the rotor structure 165. The high temperature high pressure gas from all of the combustors 167a–167p enters the turbine section 162 and expands through the turbine blades 172 and 173 to cause rotation of the rotary blades 173 and thereby drive the rotary blades 164 of the compressor 160 on the same rotor structure 165. The hot exhaust gas leaving the turbine section 162 exhausts axially by way of an exhaust duct 174 from whence it flows into the inlet duct for the heat recovery steam generator 18.

The variable inlet guide vane mechanism 15 is located just inside the air intake structure 175 of the compressor section 160, just ahead of the first set of compressor blades 163 and 164. The inlet guide vanes 15 are used to adjust the compressor air flow during the starting cycle and to increase part load efficiency.

The two bearings which support the single rotor structure 165 of the gas turbine 12 are indicated at 176 and 177. As seen, these bearings 176 and 177 are located outside of any high pressure temperature zone. The electric generator 13 is coupled to the cold or compressor end 178 of the rotor structure 165 to avoid potential misalignment problems. Some air is removed from the compressor 160 by way of outlet 180, externally cooled and filtered by an air cooler and returned to the turbine section 162 to cool the first two sets of stationary blades 172 and the first set of rotary blades 173. The cooling air for the stationary blades 172 enters through inlets 181 and 182, while the cooling air for the first set of rotary blades 173 enters via inlet 183.

For more detail on the structure of other apparatus in the plant 10, reference is made to Ser. No. 495,765.

Plant Control System

The plant control system 50 is organized to operate the plant equipment safely through startup and loading with high reliability so that the plant is highly and quickly available to meet power demanded from it. To achieve this purpose, the plant control system is preferably embodied in digital/analog hybrid form, and the digital/analog interface is preferably disposed in a way that plant protection and plant availability are enhanced.

Generally, the total plant power is controlled by controlling the operating level of the turbines and the afterburners, but the steam turbine goes into a follow mode of operation once the steam bypass valves are closed and the steam turbine inlet valves are fully opened. In the follow mode, the steam turbine produces power at a level dependent on the steam conditions generated by the heat inputs to the steam generators.

Figure 3:
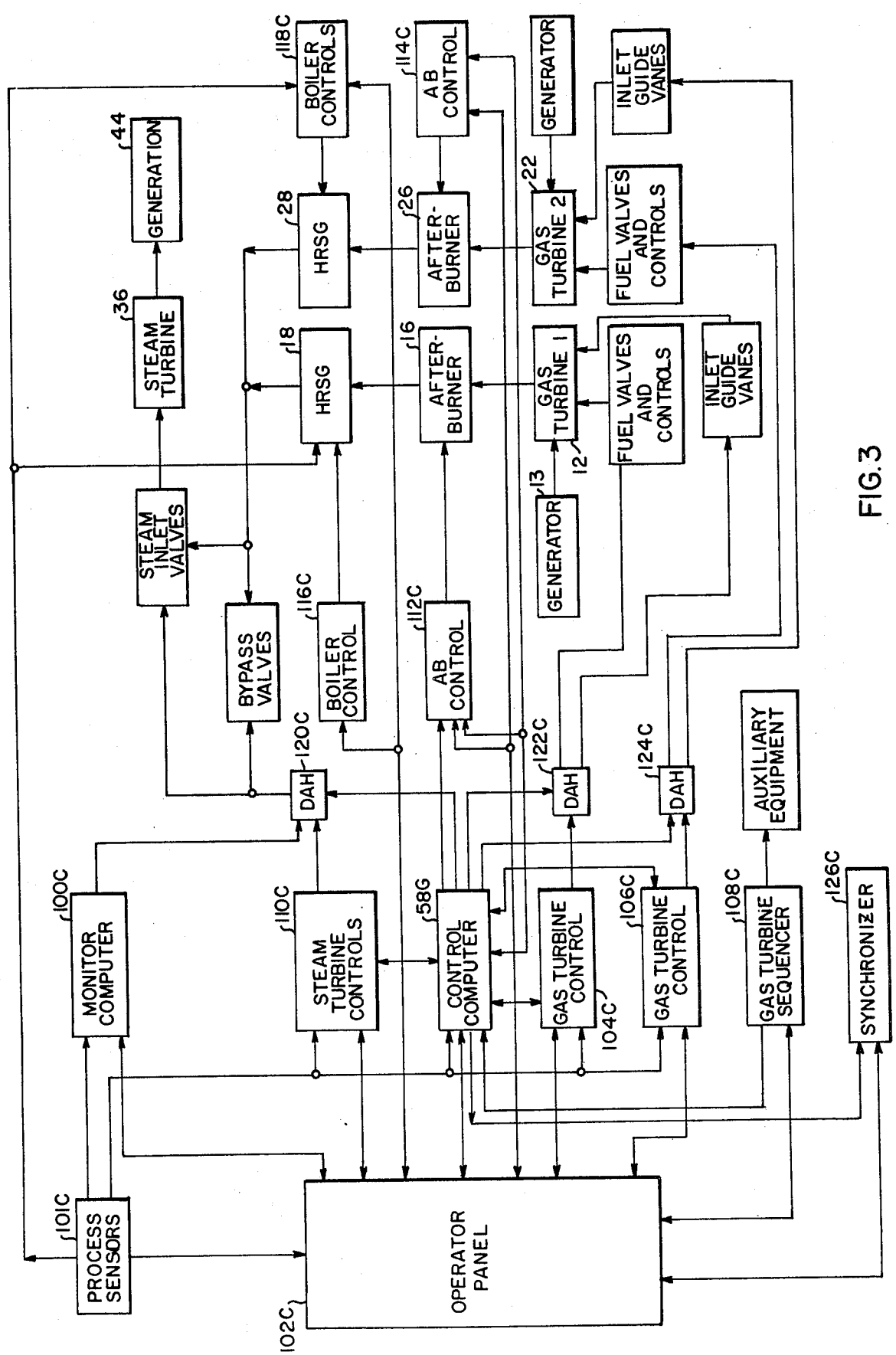
FIG. 3 shows a schematic view of a control system arranged to operate the plant of FIG. 1 in accordance with the principles of the invention.

As shown in FIG. 3, the control system 50 includes a digital control computer 58G, a digital monitor computer 100C and various analog controls for operating the plant equipment in response to process sensors 101C while achieving the described objectives. In this instance an automatic startup control for the steam turbine 36 is largely embodied in the monitor computer 100C. An operator panel 102C provides numerous pushbutton switches and various displays which make it possible for the plant to be operated by a single person. The pushbutton switches provide for numerous operator control actions including plant and turbine mode selections and setpoint selections.

In the operator analog or manual mode of operation, the operator sets the fuel level for the gas turbines 12 and 22 and the afterburners 16 and 26 through gas turbine controls 104C and 106C during loading, but an analog startup control included in each of the gas turbine controls 104C and 106C automatically schedules fuel during gas turbine startups. In addition, sequencers 108C start and stop auxiliary equipment associated with the gas turbines during gas turbine startups. The turbine bypass steam flow and the turbine inlet steam flow are controlled by operator valve positioning implemented by a steam turbine control 110C during steam turbine startup and loading in the operator analog mode. Certain automatic control functions are performed for the steam and gas turbines by the controls 104C, 106C and 110C in the operator analog mode.

In the operator automatic mode, the computers 58G and 100C perform various control functions which provide for automatic startup and automatic loading of the gas and steam turbines under the direction of the operator on a turbine-by-turbine basis. Afterburner controls 112C and 114C and boiler controls 116C and 118C operate under operator setpoint control during the operator analog and operator automatic modes. Respective digital/analog hybrid circuits 120C, 122C and 124C interface the digital and analog controls.

Under plant coordinated control, the computer 58G generally directs the plant operation through startup, synchronization and loading to produce the plant power demand. The extent of coordinated plant control is dependent on the existing plant configuration, i.e. according to the availability of apparatus for operation or for coordinated operation. For example, if a gas turbine is shut down, it is excluded from coordination. Similarly, if the gas turbine has been excluded from coordinated control by the operator, the computer 58G will operate accordingly. In all coordinated control cases, the boiler controls 116C and 118C function separately, i.e. they react automatically to operator setpoints and signals generated by the process sensors 101C to control the steam generators according to plant conditions produced by coordinated turbine and afterburner operations. The computer 58G provides setpoint signals for the afterburners in the coordinated control mode but not in the operator automatic mode. Coordinated control provides the highest available level of plant automation, and the operator automatic and operator analog modes provide progressively less automation. Some parts of the analog controls function in all of the plant modes.

Generator synchronization is performed by a synchronizer 126C under operator control or under computer control in the coordinated mode. Generally, the respective generators are sequenced through synchronization by switching actions applied to the synchronizer inputs and outputs.

Once the plant reaches hot standby and either gas turbine or both gas turbines have been started, the steam turbine can be started when minimum steam supply conditions have been reached. Thereafter, the turbines are accelerated to synchronous speed, the generators are synchronized and the fuel and steam valves ae positioned to operate the turbines at the demand load levels. The manner in which the control system 50 is configured and the manner in which it functions throughout startup and loading depends on the selected plant mode and the selected or forced plant configuration and the real time process behavior.

Figure 4:
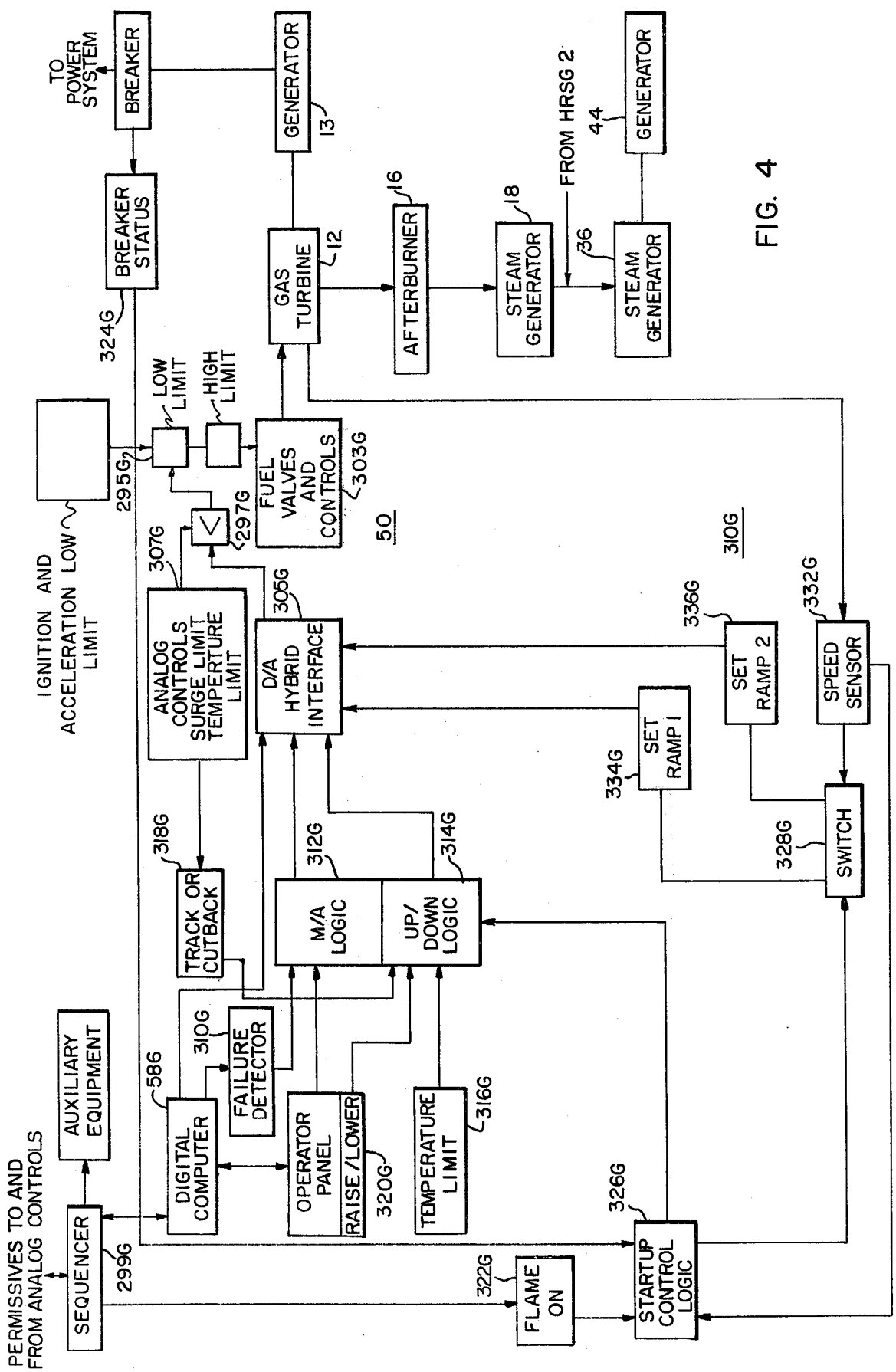
FIG. 4 shows a schematic diagram of the plant control system with elements of a simplified backup startup control illustrated to indicate more particularly the preferred manner of embodying the invention.

D. Startup Control Especially Useful As A Backup Control For A Primary Automatic Controller As shown in FIG. 4, the preferred embodiment comprises a backup startup control system 301G which is included in the plant control system 50 to provide increased plant availability in an efficient and simplified manner. Generally, automatic startup control for the gas turbine 12 is provided by the digital computer 58G and a sequencer 299G. The gas turbine throttle valve is progressively opened by a throttle valve control included in block 303G in response to a fuel demand signal from a digital/analog hybrid interface block 305G under surge limit and overspeed limit protection from a block 307G. In the automatic mode, the hybrid block 305G is operated by the digital computer. The sequencer 299G generates the signals necesary to govern ignition, starting device assist and other startup events. In this case, the starting device is an electric motor which provides relatively high torque over its operating speed range. If the computer should fail during automatic gas turbine startup, i.e. during an entire plant startup or during gas turbine startup after the entire plant has been operating, the gas turbine startup attempt would fail and the associated generation capacity would be unavailable unless a backup mode of operation is provided. Thus, in this case with backup control, a computer failure detector 310G automatically causes a switchover from automatic control to backup control through manual/automatic logic 312G when the computer fails or rejects to manual and turbine and plant availability are accordingly increased by this provision.

On switchover, the backup startup control 301G takes control of the turbine 12 bumplessly because the hybrid block 305G holds at its last fuel demand output and after switchover increases or decreases the fuel demand output according to increase or decrease signals generated by the backup startup control 301G through up/down logic 314G. During automatic startup, exhaust temperature limit control is placed on the operation of the gas turbine 12 by programmed operation of the digital computer 58G. On switchover to the backup startup control 301G, temperature limit control is provided by an analog circuit block 316G through the up/down logic 314G. More complete disclosure is provided on this subject in a copending and coassigned patent application Ser. No. 495,694 "A Combined Cycle Electric Power Plant And A Gas Turbine Having Improved Exhaust Temperature Limit Control" and filed by J. R. Smith and T. J. Reed concurrently herewith.

As already indicated, surge limit and overspeed limit protection are provided by the block 307G, through a low select block 297G, and such protection is provided by analog circuitry in the block 307G during both automatic and backup modes of operation. If the surge limit control or the overspeed limit control become operative, a track or cutback block 318G functions through the up/down logic 314G to cause the output from the hybrid block 305G to track or to cut back relative to the downstream limited control signal value until the limit action ceases.

The startup control system 301G can function as a simplified and otherwise improved primary control for the gas turbine 12 under operator selection from an operator panel 320G. It can function as a backup startup control for the automatic digital computer controller in the manner already indicated.

If flame detectors indicate that the flame is on as indicated by block 322G and if block 324G indicates that the breaker is open, a startup control logic block 326G operates a switch 328G. The block 326G also triggers the up/down logic 314G to cause the output from the hybrid block 305G to increase in voltage value along a ramp as a function of time.

Figure 5A:
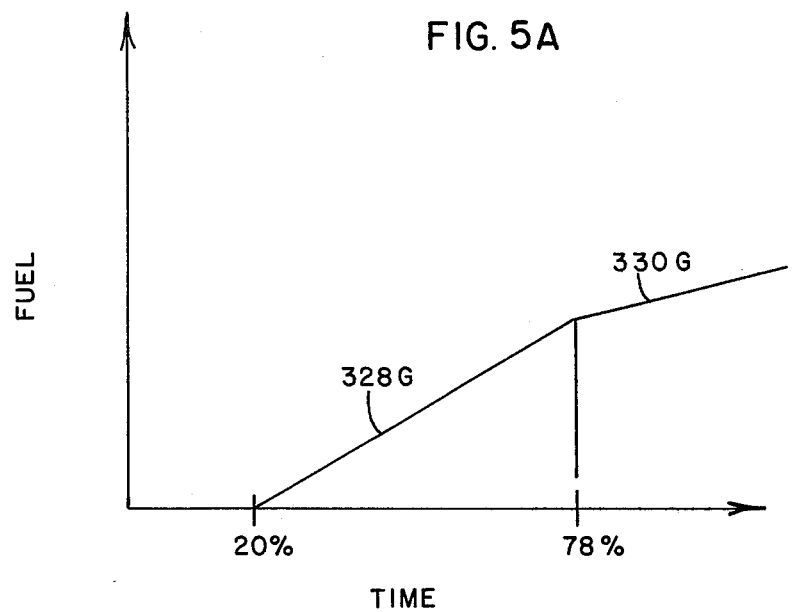
FIG. 5 shows a plot of the fuel demand generated by the startup control as a function of time during the startup period.

As shown in FIG. 5, the ramp generation function is made up of a first part 328G and a second part 330G. The first ramp 328G functions during the time period when the turbine 12 is accelerating from the ignition speed of 20% synchronous value to a higher speed equal to 78% of synchronous value. From 78% synchronous speed to approximately 98% synchronous speed, the second and preferably lower sloped ramp 330G is controlling. Thereafter, turbine speed is held or placed under the control of a synchronizer (not shown). Over a first part of the first ramp 328G, a downstream low limit block 295G applies a low limit signal to the throttle valve control for ignition purposes. When the NHC fuel reference value is ramped sufficiently high by the startup control, the NHC fuel reference output becomes controlling.

The slope of the first ramp 328G at lower speeds is valued to allow the fuel to be scheduled by feedforward operation of the startup control system 301G normally without temperature limit action by the temperature limit control 316G. The second ramp 330G is provided with a slope different from that of the first ramp 328G to permit turbine operation normally without temperature limit action over the higher speed range and to do so while permitting the turbine to reach synchronous speed within a specified time which enhances generation availability. The crossover speed between the two ramps 328G and 330G is set in this case at 78%, although the crossover value is subject to variation according to turbine and control system design considerations. Generally, as illustrated in FIG. 5D, some allowable maximum fuel ramp defined by cycle temperature limits can be defined for a gas turbine. In most cases, starting time from ignition to synchronization as indicated by line 293G is specified for the turbine. To reach synchronization in the specified time, the fuel reference required at synchronous speed must be reached along a fuel reference function which is equivalent to the illustrated average fuel ramp. Each turbine has characteristic power assist requirements and a characteristic self-sustaining speed as represented by dotted line 291G. Starting devices vary significantly in power rating and cost and in how long they can function under maximum drive operation before they must be uncoupled from the turbine as indicated by dotted line 293G. The dotted lines 291G and 293G shift along the abscissa according to the characteristics of particular turbines and starting devices. Therefore, substantial constraint normally exists on the selection of starting devices for a particular gas turbine as indicated by the shaded arcs.

In the present case, the ramp function 328G, 330G is characterized with a higher sloped first part since the rating of the starting electric motor is sufficiently high to permit fast accelerations during power assist operation. With lower power starting devices a ramp such as the ramp 295R might be usable. Thus, the analog startup control provides significant flexibility in selecting starting devices which meet performance requirements while economizing in manufacturing cost.

A speed sensor 332G generates a signal which permits startup control and which indicates which of the two ramps 328G and 330G is to be generated. The switch 328G functions through blocks 334G and 336G to set the ramp generation in the hybrid block 306G.

Generally, with the ramp operation of the startup control, a reasonably fast startup speed schedule is provided, and although the speed schedule is not an optimum one it is relatively simplified, reliable and suited to turbine performance objectives. As a backup control, unnecessary turbine shutdowns are avoided by the functioning of the backup startup control 301G and an automatic turbine startup which is interrupted is bumplessly continued by the backup control system 301G without requiring a hold at turbine speed which could cause damaging turbine blade vibrations.

SYSTEM FUNCTIONS

Portions of the backup startup control system 301G are shown in somewhat greater functional detail in FIGS. 6A through 6H. Thus, a fuel reference is generated by the NHC hybrid interface card 112G as indicated by the reference character 115G. Fast and normal raise and lower pushbuttons 212G, 214G, 216G and 218G in box 100G on the operator panel function through RAISE AND and OR blocks 213G and 215G and LOWER AND and OR blocks 217G and 219G to apply inputs to the NHC card 112G which enable the fuel reference to be raised or lowered in the operator analog and manual modes. The normal raise and lower pushbutton signals are also applied to AND blocks 221G and 223G to set a normal ramp through the NHC analog clock for as long as the pushbutton is depressed. Similarly, fast raise and lower signals generate a fast ramp through AND block 225G and OR block 227G. Swithces 229G and 231G are operated to generate the normal and fast ramp control signals. In the automatic mode, the computer 58G applies signals to the NHC card 112G to generate the output fuel reference from the NHC card 112G.

Figure 6A:
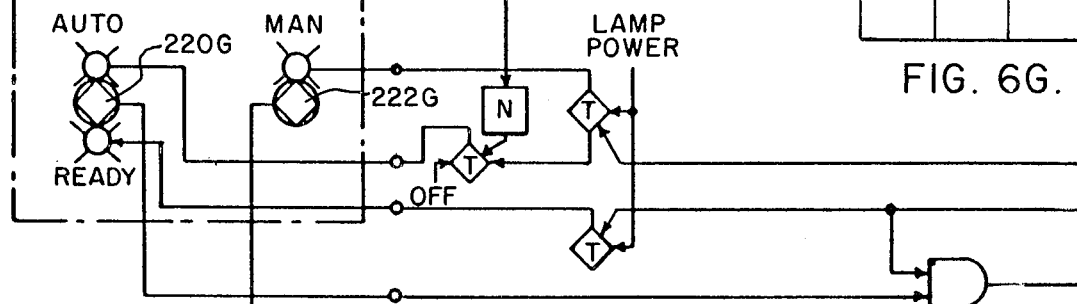
Figure 6B:
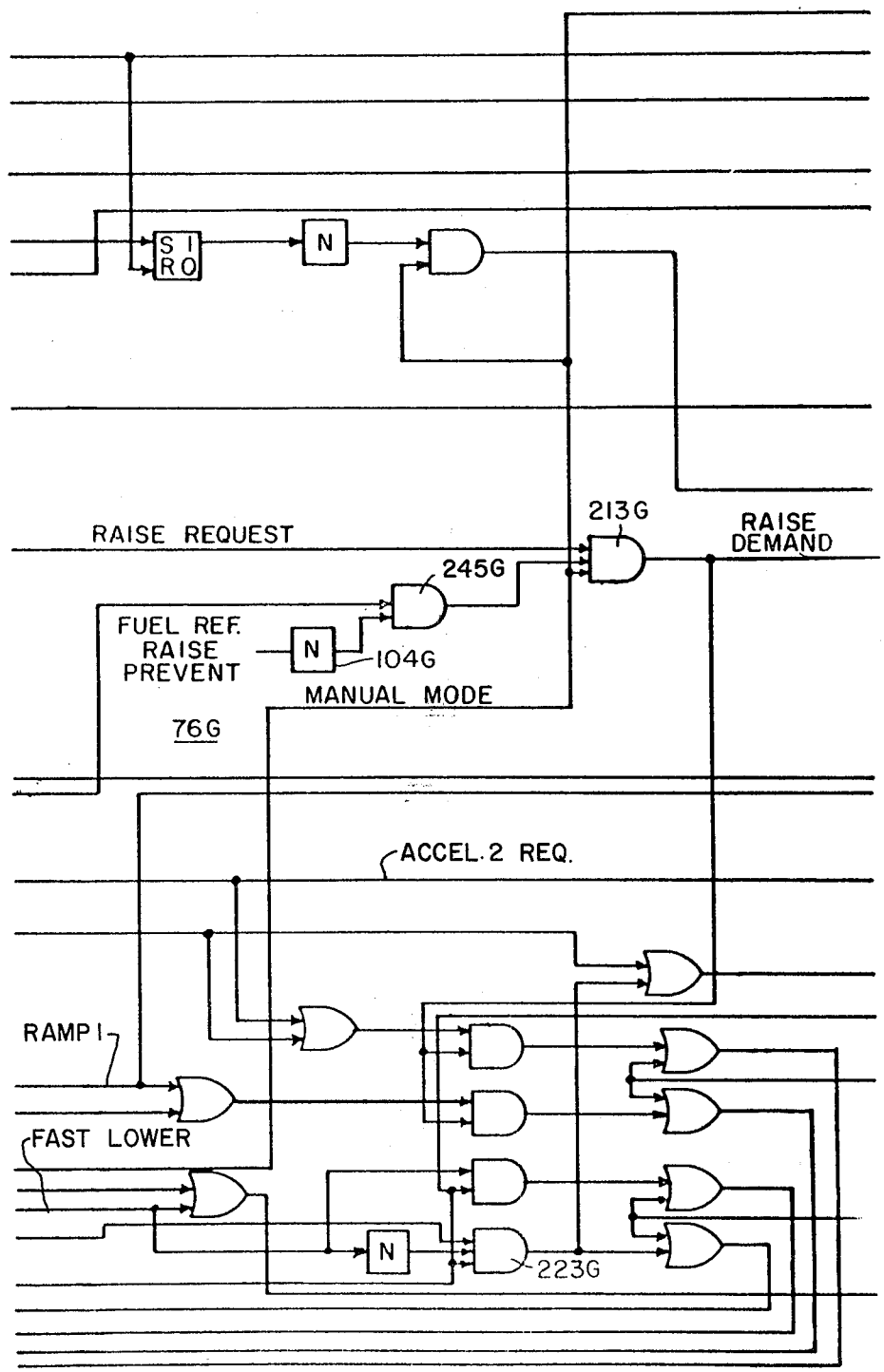
Figure 6C:
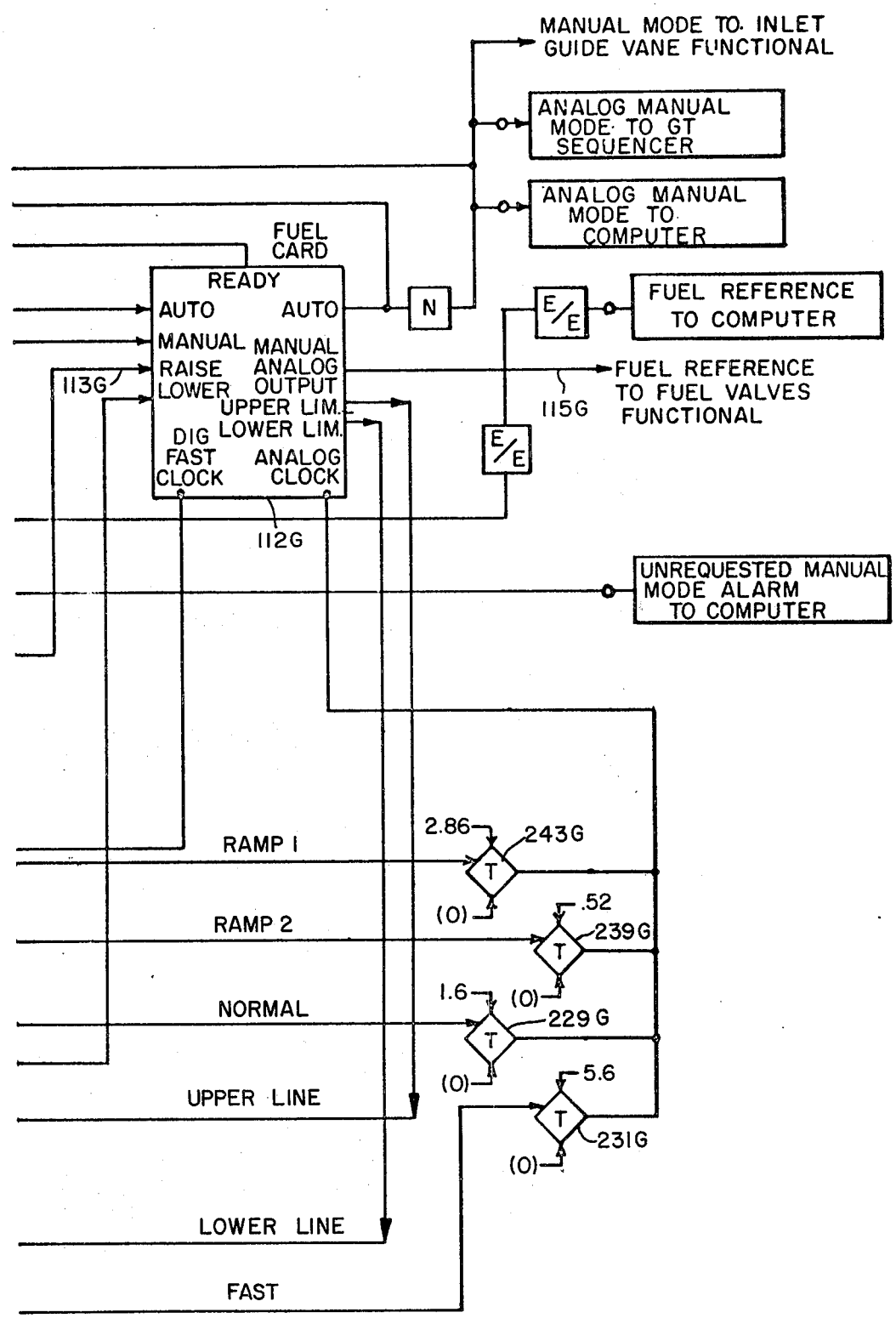

During the period prior to breaker closure, the normally selectable fast and normal ramp rate are inhibited by AND block 251G and AND block 221G (FIG. 6A). Thus, during the acceleration period the operator is blocked from requesting a different raise rate from that specified by the automatic backup conrol. Further, the operator can override the automatic analog starting ramp by generating a reference lower signal, and upon release of the lower pushbutton the startup ramp operation is resumed.

The automatic mode is selected by a pushbutton 220G if a computer READY signal is received from the NHC card 112G. The system functions in the manual or operator analog mode if a manual pushbutton 222G is pushed or if the computer rejects to manual as indicated by boxes 224G and 226G. Generally, the NHC card 112G responds to the automatic and manual mode signals to interface the manual mode control loops with the automatic mode control loops and to couple these loops with continuously functioning downstream control loops and the downstream fuel valve control.

If the turbine is placed in the startup mode and the backup control is operating, the power assist device drives the turbine 12 to ignition speed and, when ignition occurs and the flame is detected as indicated by a logical input to AND block 233G, a ramp request is generated by AND block 235G since the breaker status input signal indicates an open breaker and since the turbine speed is less than the synchronizer switchover speed of 98% rated. The raise request signal is transmitted to the NHC card through the OR raise request block 215G and the AND block 213G provided that no fuel hold or cutback request exists.

The ramp request is also applied to the input of an AND block 237G which sets the clock on the NHC card 112G for generation of the second lower sloped ramp through a switch 239G if the turbine speed is greater than 78% rated. Similarly, an AND block 241G sets the clock on the NHC card 112G for generation of the first higher sloped ramp through a switch 243G if the turbine speed is less than 78%.

As shown in FIGS. 6G and 6H, a signal representing speed being greater than 78% is generated by a monitor block which compares a 78% speed set point with a high selected turbine speed feedback signal. The first ramp causes the gas turbine to accelerate automatically in the backup control mode from ignition speed to 78% speed normally free of overtemperature limit control. At the 78% speed point, the second ramp causes the turbine to accelerate to 98% speed at a lower acceleration rate normally free of overtemperature limit control. Thereafter, the turbine is in an idle where it can be placed under synchronizer control for generator synchronization.

Generally, the scheduling of fuel to a gas turbine during startup is a critical matter. At ignition, the amount of fuel supplied must be controlled accurately because the air flow from the compressor is low and too much fuel can cause excess turbine inlet temperatures while too little fuel can cause flameout and reduced turbine availability by shutdown. As the turbine accelerates, the air flow increases and the fuel flow is increased to maintain the acceleration. The rate at which fuel flow increases determines the rate of acceleration and it is accurately and reliably controlled in a simplified manner by the described system to provide highly available gas turbine and combined cycle plant generation capacity.

Figure 5B:
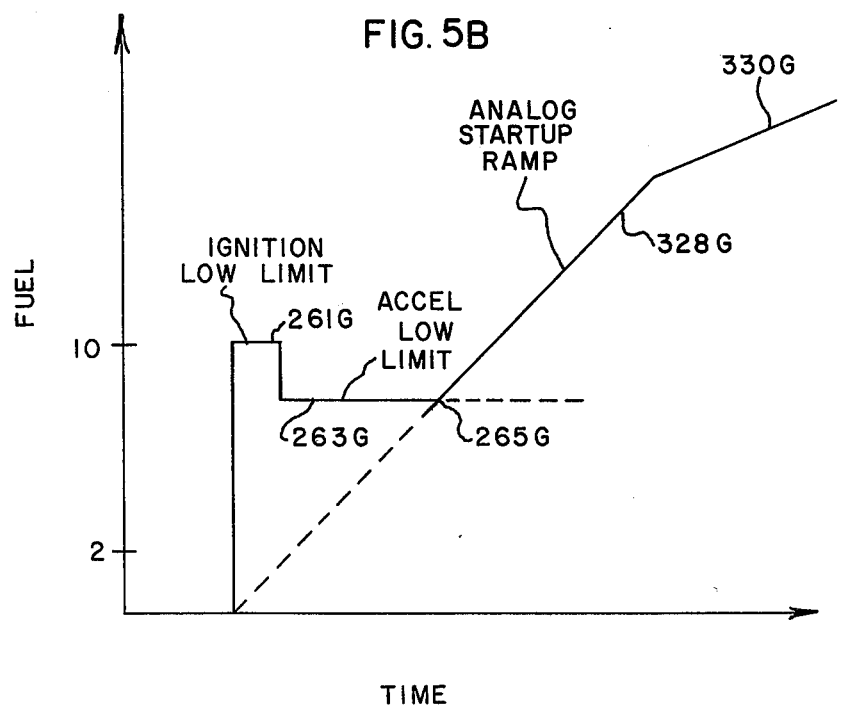
Figure 5C:
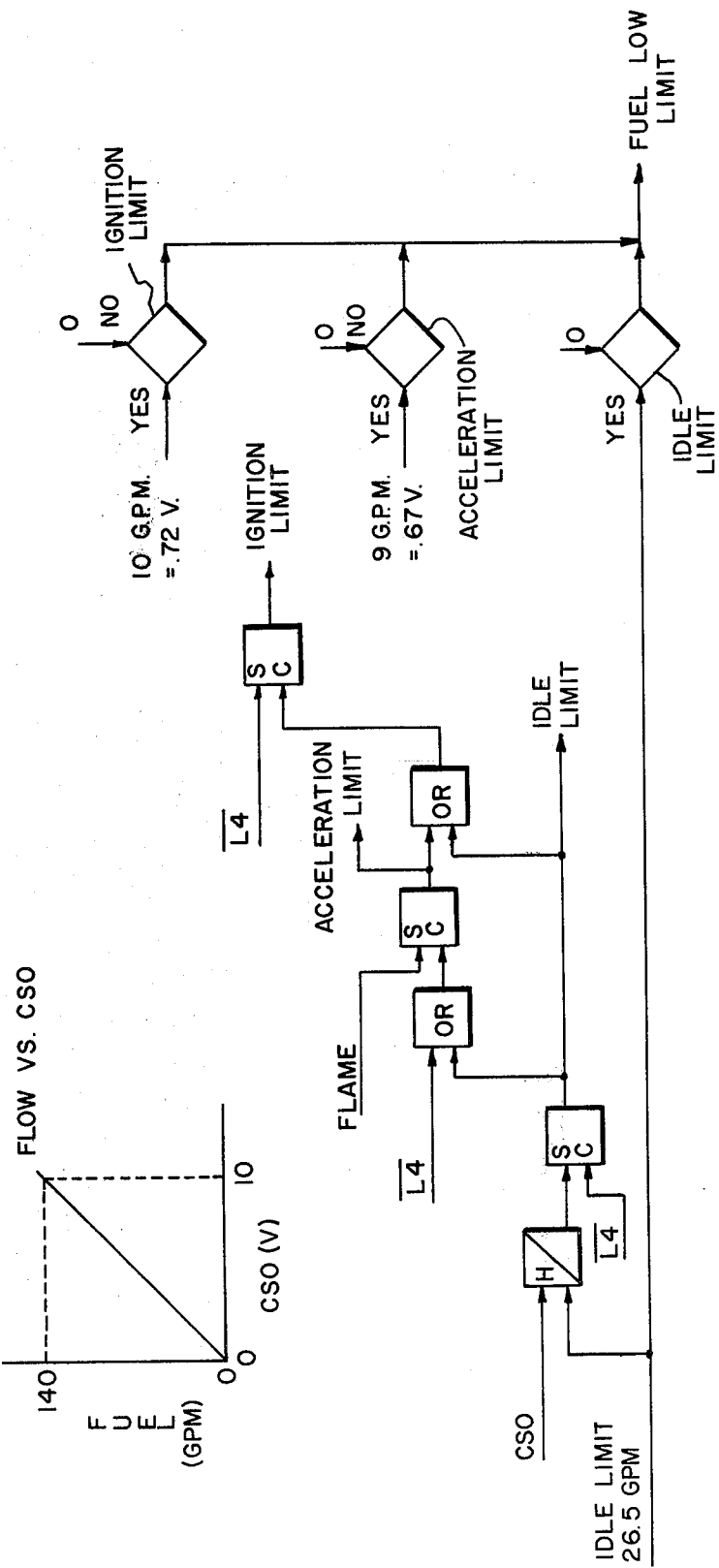

As shown in FIG. 5B, smooth turbine fueling operation is achieved during lightoff. As schematically shown in FIG. 5C an ignition fuel low fuel limiter generates a fuel reference 261G at lightoff and a short time later an acceleration low fuel limiter generates a slightly lower fuel reference 263G. The analog ramp 328G is started at ignition and continues to rise without controlling effect because of downstream low select action until it reaches the acceleration low limit value at point 265G. At that time, the feedforward ramp 328G takes control smoothly and accordingly results in reliable lightoff with relatively low thermal shock to the unit. The fact that the fuel schedule function is composed of at least two ramps provides extended flexibility in plant design and operation relative to the constraints of turbine cycle temperature limits, allowable turbine cycle temperature limits, allowable turbine startup time, allowable starting device operating time for the selected sizes of the turbine and the starting device and the speed at which the turbine becomes self sustaining. Further, the startup control is independent of any sensors which might not be able to operate accurately in the low speed range region near lightoff. With feedforward startup control, smooth control action is achieved on switchover from automatic to manual backup control and fuel demand swings are avoided that otherwise could have a significantly adverse effect in the startup period.

As shown in FIG. 6A, temperature limit control can become controlling during the startup mode if abnormal conditions develop. Thus, either the OR block 219G or an AND hold block 245G (FIG. 6B) function during startup to drop the fuel demand signal or to hold the fuel demand signal at its existing value, i.e. to override the startup ramp.

Figure 6D:
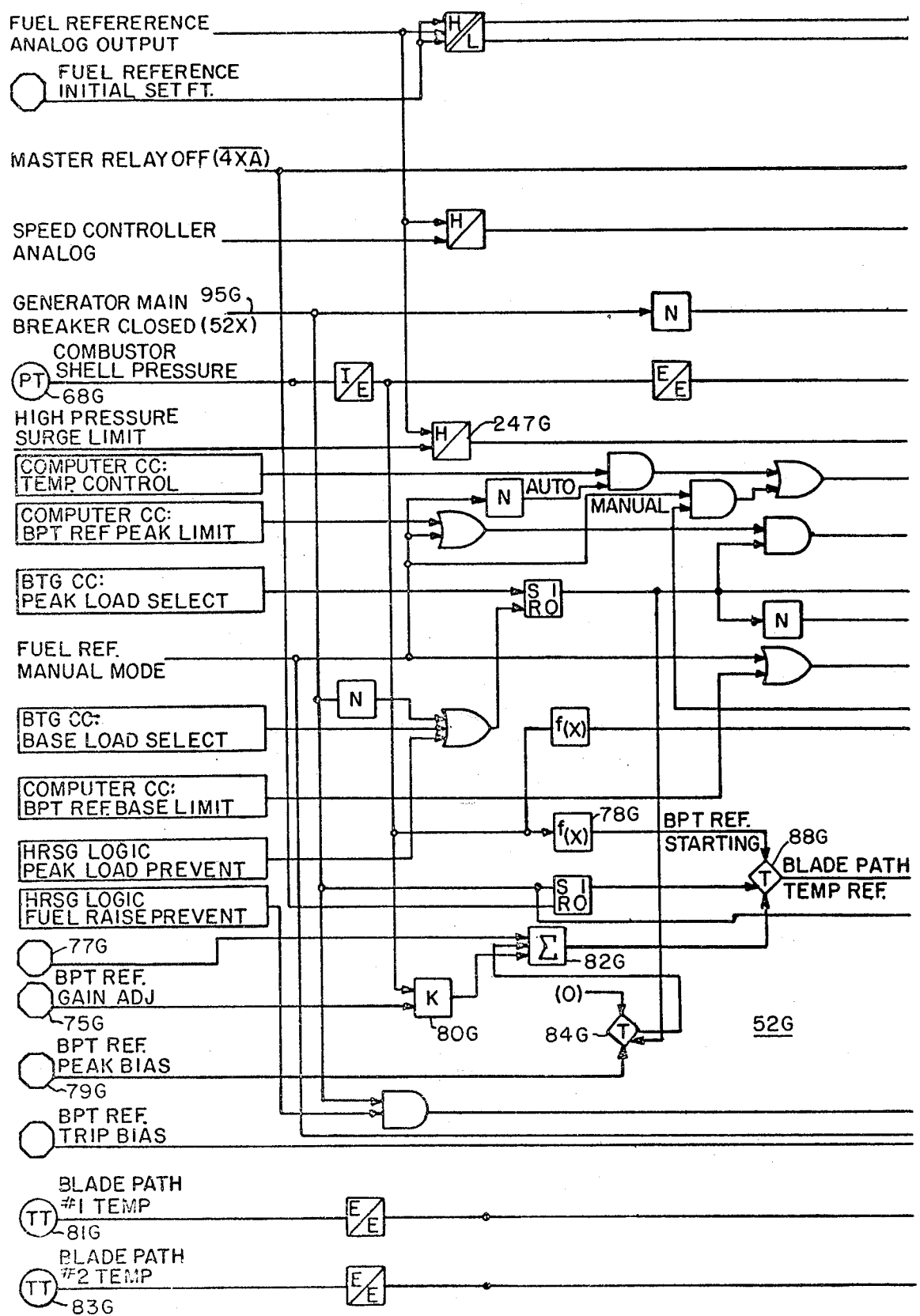
Figure 6E:
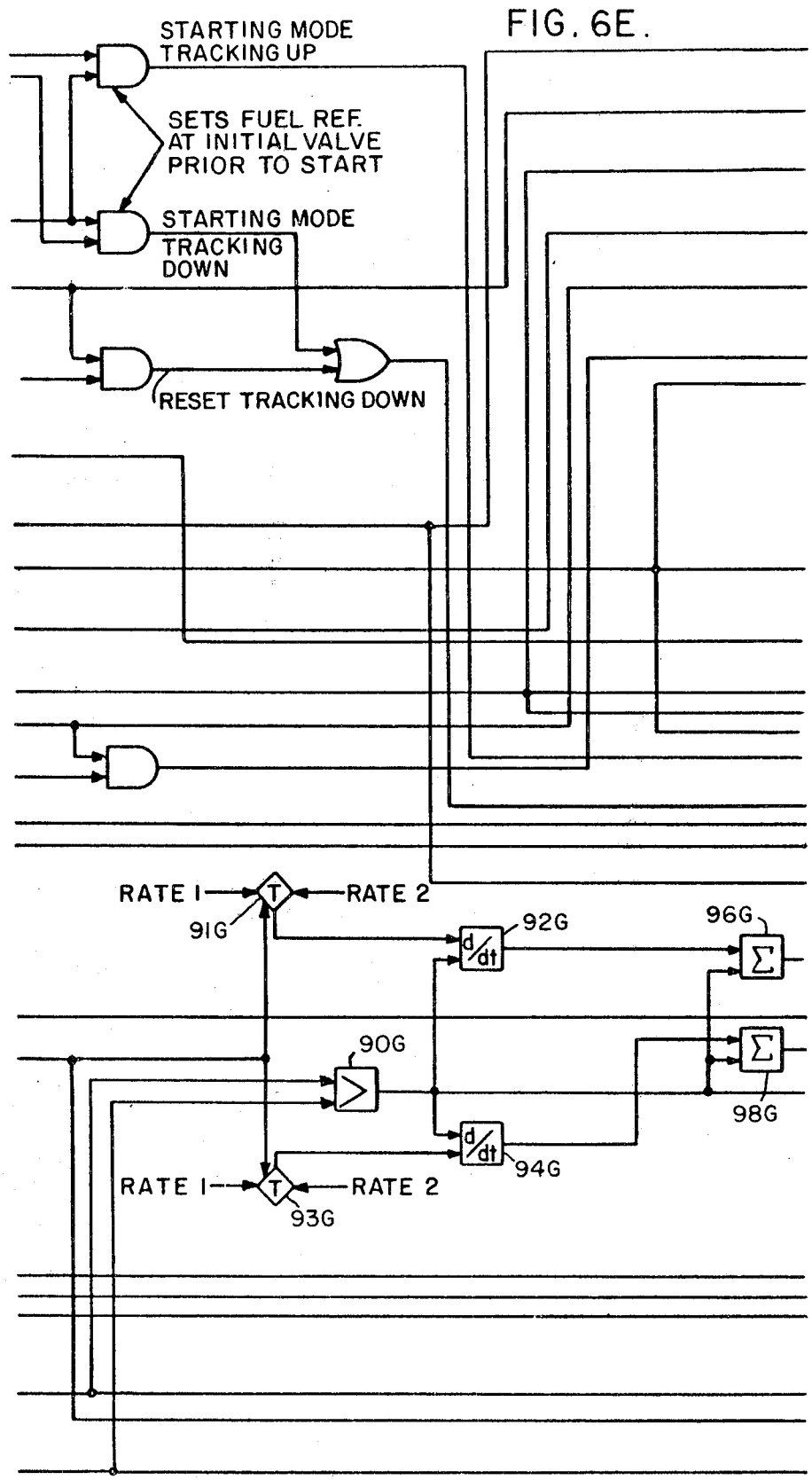
Figure 6F:
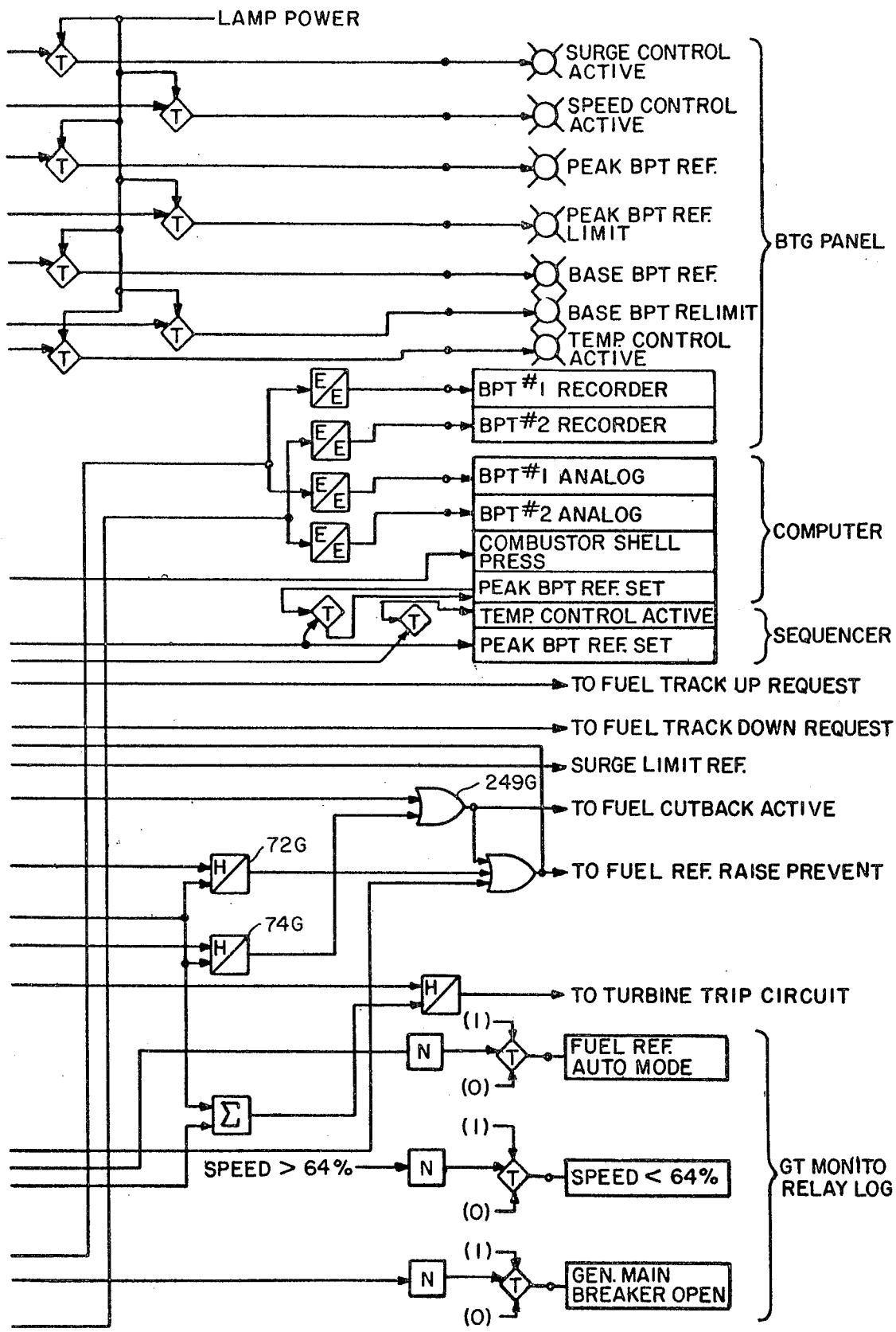

As shown in FIGS. 6D through 6F, if the downstream surge limit becomes controlling, a monitor block 247G causes an OR block 249G to generate a fuel cutback signal which is applied to OR block 219G so that the fuel reference output from the NHC card 112G is moved back to keep the NHC fuel reference lined wih the actual fuel demand applied to the valve position controls.

DIGITAL/ANALOG HYBRID COUPLER (NHC) CARD

Figure 8:
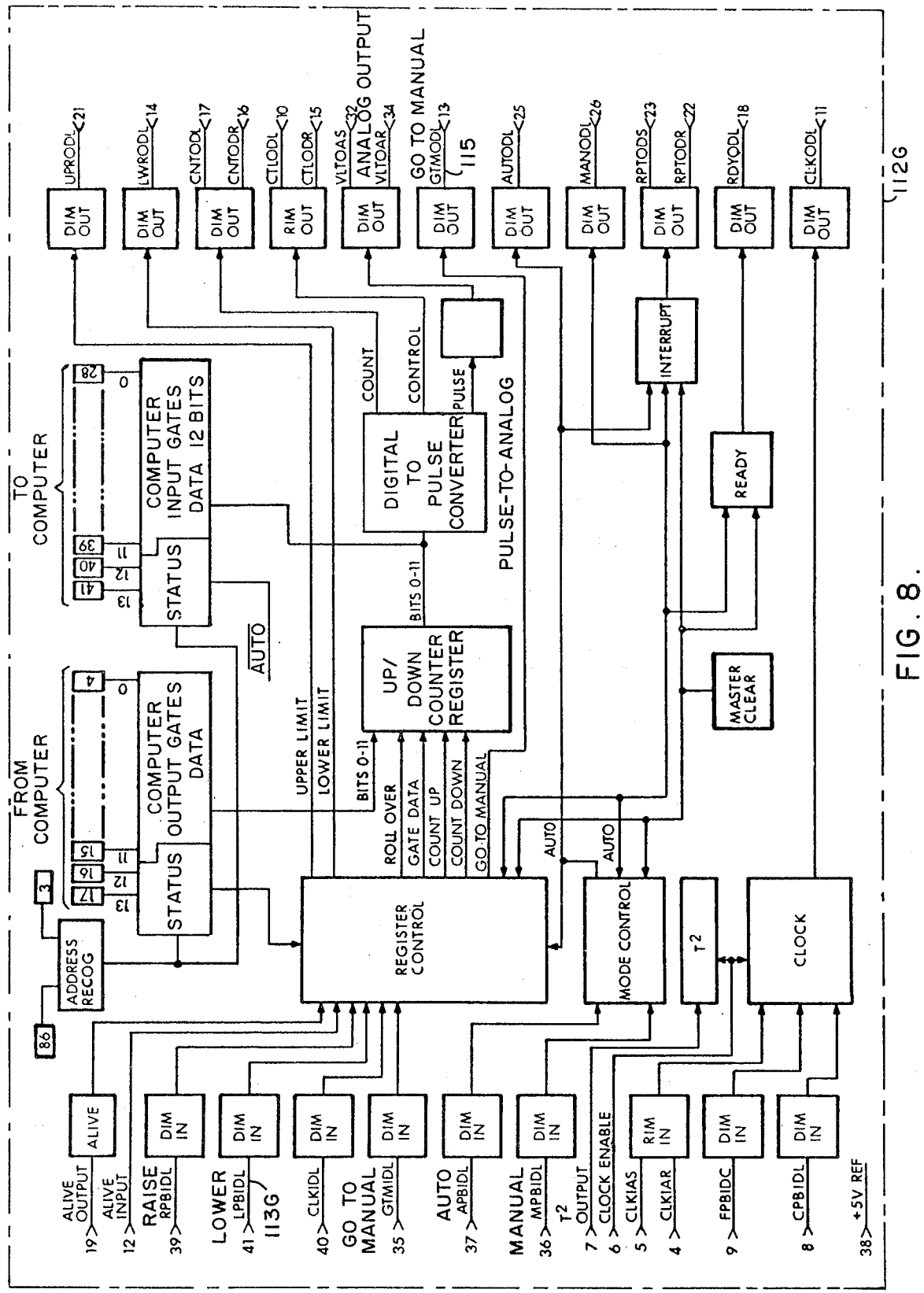
FIG. 8 shows a schematic diagram of a circuit card which provides a hybrid interface between the digital computer circuitry and the analog circuitry employed in the gas turbine control system.

As shown in greater detail in FIG. 8, the fuel reference raise and lower signals are applied to the input of an NHC register control which causes an up/down counter register to count up or count down according to whether a raise demand or lower demand is in effect. On hold operation, an operator raise request is defeated, and on a cutback operation or a track down operation, a fuel reference lower demand is generated at the input of the register control to cause the register to count down. The register output is converted to pulses which in turn are converted to an analog output for application as a fuel reference to the fuel valve control as indicated by the reference character 115G.

An NHC card (FIG. 8) converts a 12 bit binary number from the computer to an analog output signal. This card operates in either the manual or the automatic mode. In the automatic mode, the NHC card output can be set or read by a computer peripheral channel. In the manual mode, the NHC card output is controlled by signals generated outside the computer which raise or lower the output.

In automatic operation, if the computer does not update the NHC card within a set time period, the card is set to the manual mode by an alive circuit. The alive circuit has a timing device which can be set for 1, 5, or 20 seconds. The time period is selectable by resistor and capacitor values.

In manual operation, clock pulses determine the rate of change of the analog output signal. The clock pulses may be generated by either an external or an internal clock.

Automatic Operation

The computer uses a 14 bit word to send and receive data and status. When the address recognition circuit senses that the computer is addressing the NHC card, it gates the data and status bits through the output gates. The status bits are routed to the register control and the data bits are routed to the up/down counter. The status bits are decoded and appropriate action is taken. The output of the up/down counter (which contains the last word from the computer) is converted to a pulse train by the digital/pulse converter. The pulse train is then converted to an analog signal. The output of the up/down counter and the status bits are routed to the input gates and sent to the computer.

Manual Operation

In the manual mode, the count in the up/down counter is regulated by external raise (RPBIDL) and lower (LPBIDL) signals generated either by pushbuttons from a manual/automatic control station or by logic circuitry. The clock will increment or decrement the counter as long as the raise or lower signal is present. Roll over is inhibited; that is, the up/down counter cannot count past 4095 or below 0. The clock rate, which is adjustable by analog control, i.e. by means of a variable voltage at pins 4 and 5, determines the amount of time it takes to change the signal level. When the raise or lower signal goes low, i.e. logical zero, the count in the up/down counter is held; thus, the analog output signal remains constant at that level. The D/A register consists of a set of binary up/down counters which accept parallel data and act as latches in the Automatic mode. In Manual mode the operator (or external logic) has control of the counters and can count them up or down. The raise/lower logic and the clock control this process. The raise and lower inputs control which direction the counters move. The counting rate is determined by the clock. If both raise and lower are enabled simultaneously the counters will do nothing.

Manual/Auto Transfer

If forced to Manual mode, the analog output signal remains unchanged at its last value until increased or decreased manually; thus, the transfer is bumpless. The external interrupt alerts the computer to a change in the card's operating mode. It is activated when the card goes from Auto to Manual or from Manual to Auto for any reason. A manual to auto transfer may be initiated only by the operator depressing the "Auto" pushbutton. The card will remain in Manual mode if any internal or external "Go To Manual" signal exists. A "Ready" output indicates that the card is in Manual mode and that no "Go To Manual" signal is present. The card can be forced to Manual by a "Go To Manual" signal. An internal "Go To Manual" is generated by the computer outputting a "Go To Manual" status, by either a "Raise" or "Lower" input, or by the Keep Alive circuit. After an Auto to Manual transition, the last number set in the D/A register by the computer remains until changed by the operator.

SYSTEM CIRCUITRY

Figure 7A:
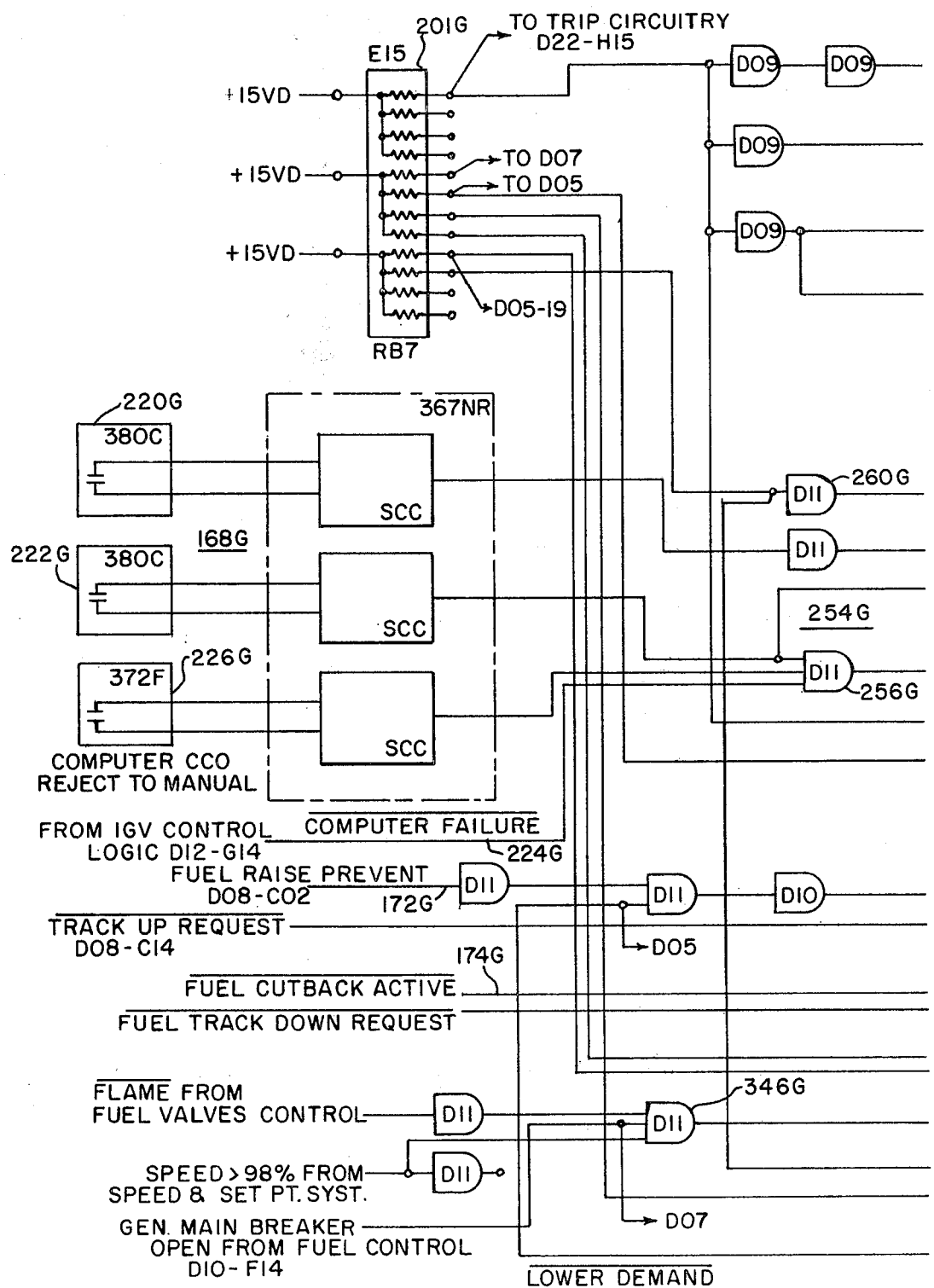
FIGS. 7A and 7H show circuitry which can be employed to embody various functional blocks in FIGS. 6A through 6H and FIG. 7I shows how these Figures are tied together.
Figure 7B:
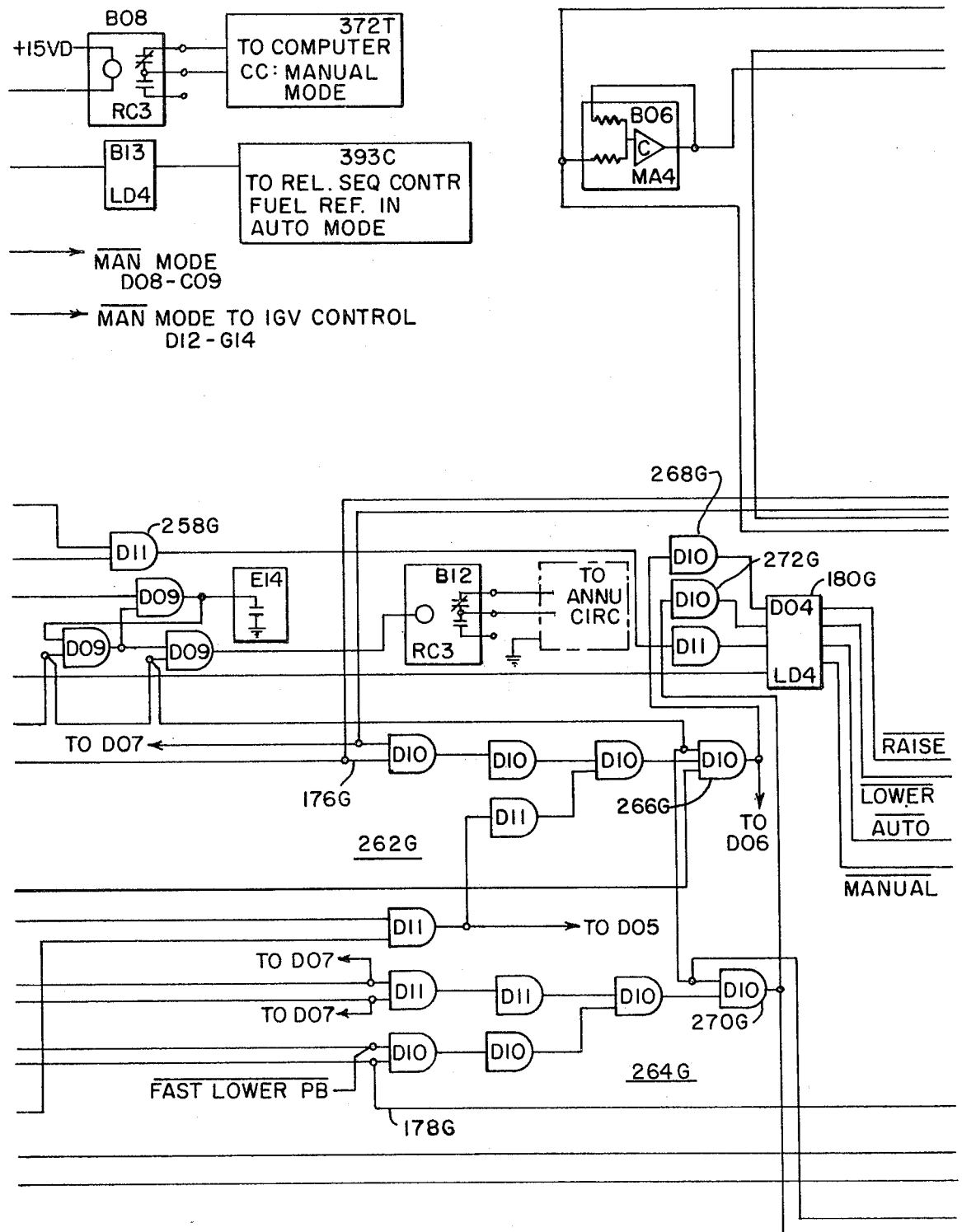
Figure 7C:
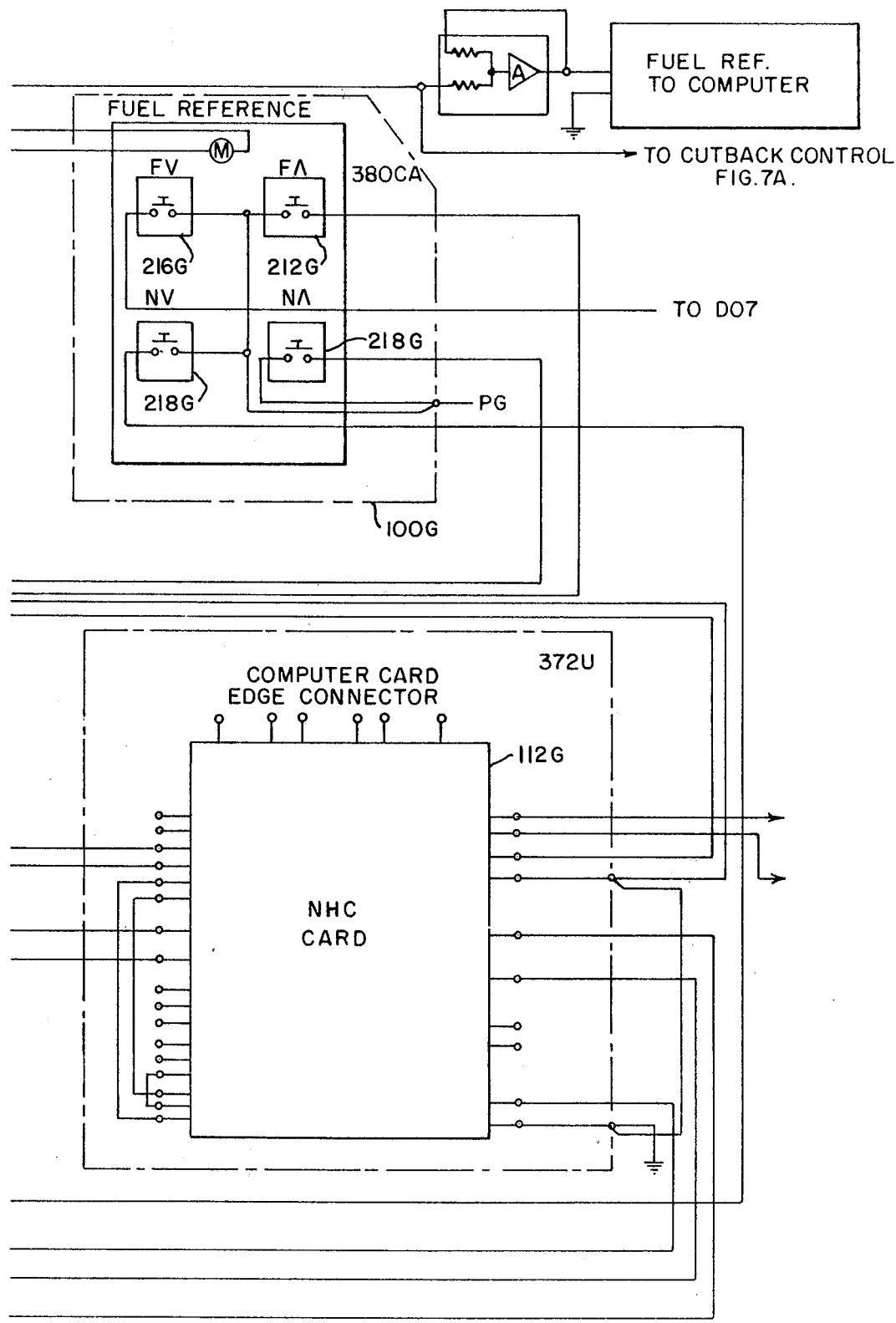
Figure 7D:
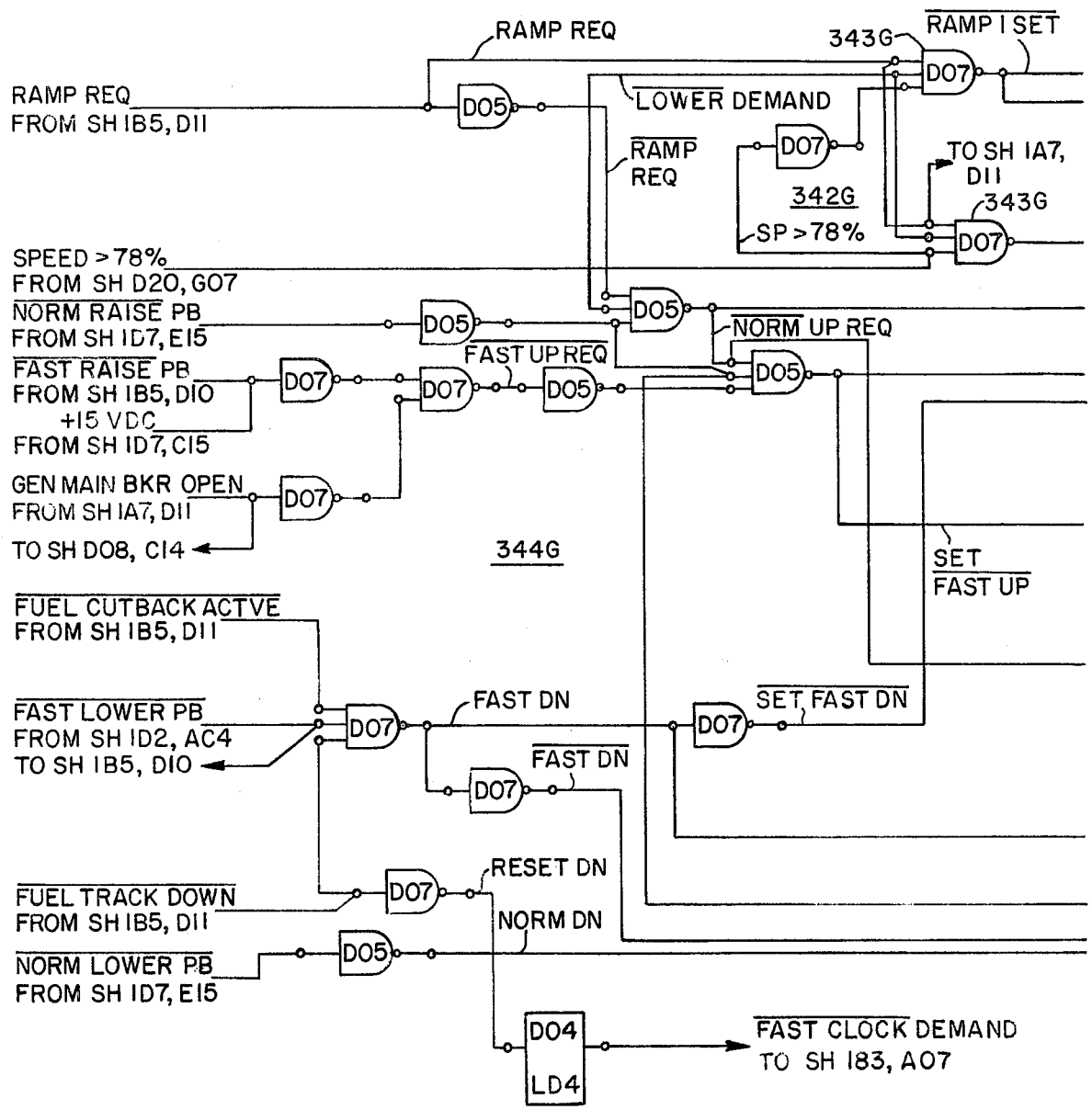

In FIGS. 7A–7H, there is shown circuitry preferably employed to implement functions described in connection with FIGS. 6A–6H. In FIG. 7A, resistors 201G function as pickup resistors to assure proper binary operation of logic circuit elements. To determine the operating mode, the pushbutton and computer reject to manual outputs are applied to mode detection circuitry 254G (FIG. 7A). Thus, AND block 256G generates a manual signal if the manual pushbutton 222G has been operated and the computer has not rejected to manual and the computer has not failed. An AND block 258G generates an automatic mode signal if block 260G indicates the computer is ready for the automatic mode and the automatic pushbutton 220G has been operated. The auto and manual signals are applied to the NHC card 112G, and the manual signal is used for logic and display purposes in various circuits.

The raise and lower pushbuttons 212G, 214G, 216G and 218G generate outputs which are applied to AND logic circuits 262G and 264G respectively. A raise AND block 266G applies a raise signal through AND block 268G to the NHC card 112G if a panel raise request exists or a startup ramp is operative on manual control with a raise permissive (i.e., no fuel hold or fuel cutback in effect). A lower AND 270G 270 applies a lower signal through an AND block 272G to the NHC card 112G if the fuel cutback channel or the track down channel is active or a panel lower request has been made on manual control.

Figure 7E:
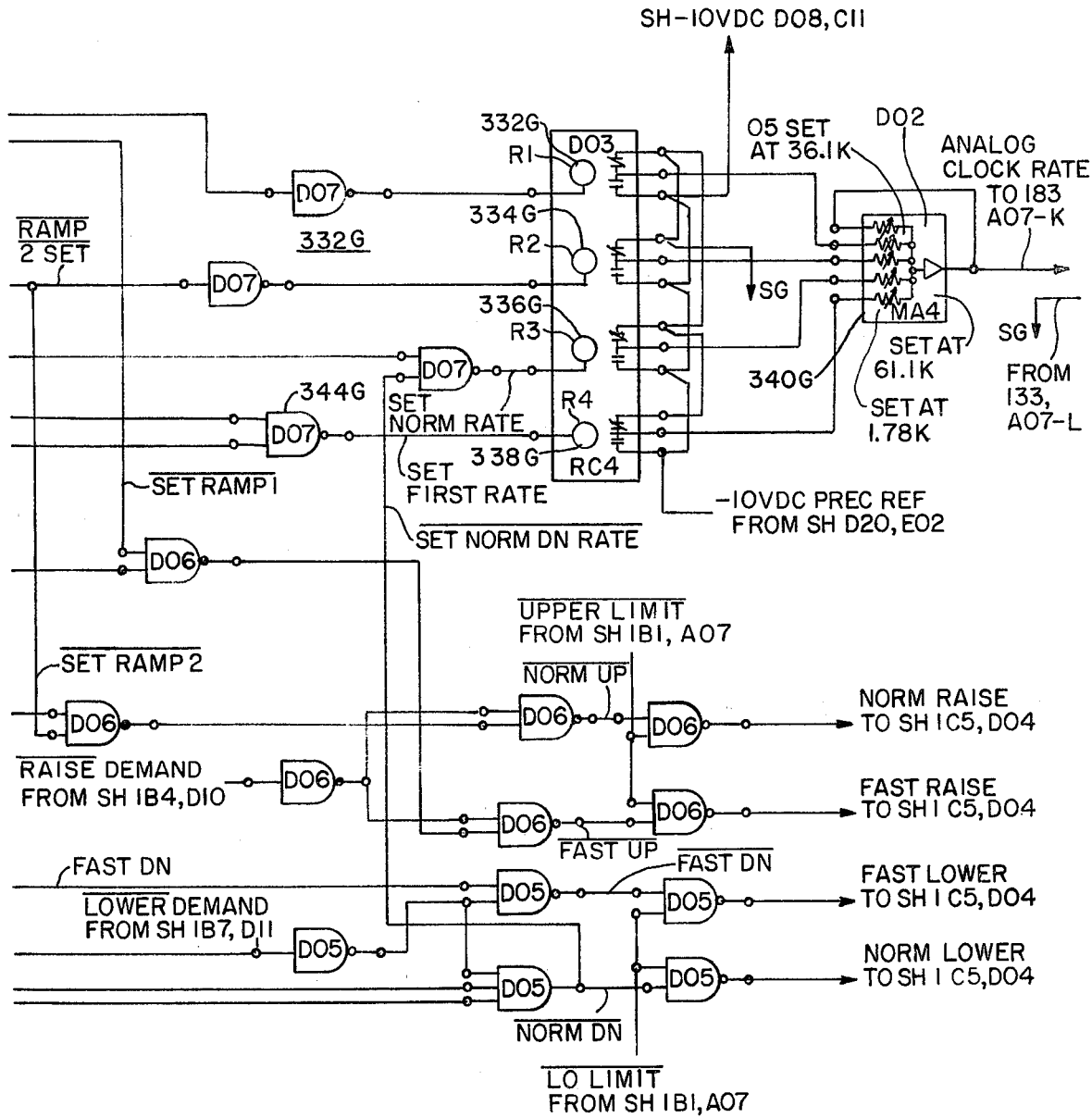

As shown in FIG. 7E, signals applied to potentiometer inputs for an amplifier circuit 340G are controlled by a post ignition ramp relay 332G, a presynchronization ramp relay 334G, a normal relay 336G and a fast relay 338G. The amplifier output voltage level is fixed by the relay applied input, and in turn it controls the analog clock to produce a corresponding ramp output from the NHC card 112G. Logic circuit 342G generates the signals to operate the startup ramp relays 332G and 334G in the manner previously described. Similarly, logic circuitry 334G operates the normal and fast relays 336G and 338G in the manner previously described. An AND block 346G (FIG.7A) operates in the startup mode to generate a ramp request for the post ignition ramp and presynchronization ramp relays 332G and 334G. AND blocks 343G and 345G (FIG. 7D) generate post ignition and presynchronization ramp operating signals according to whether the turbine speed is greater than or less than 78% rated.

Figure 7F:
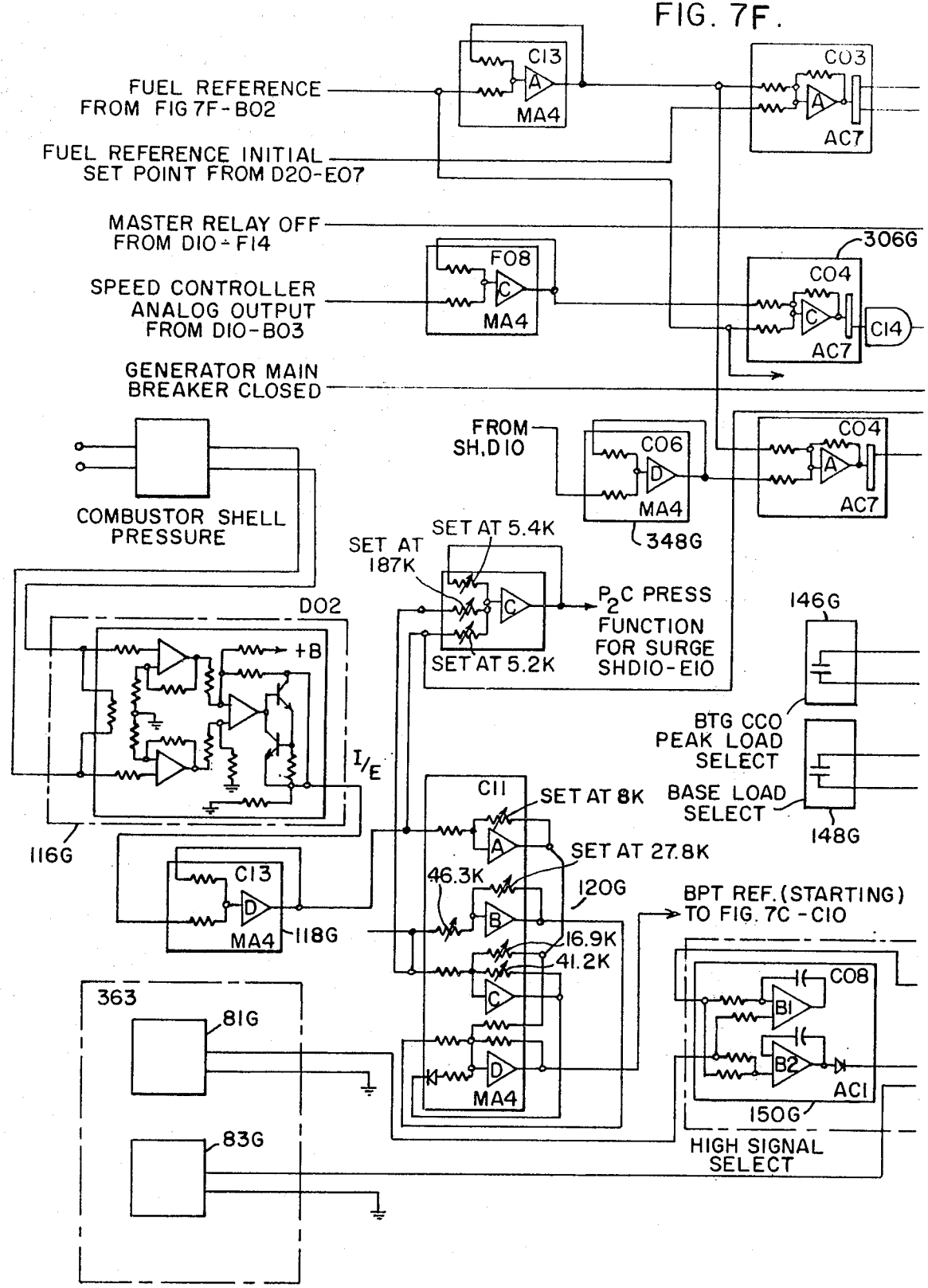
Figure 7G:
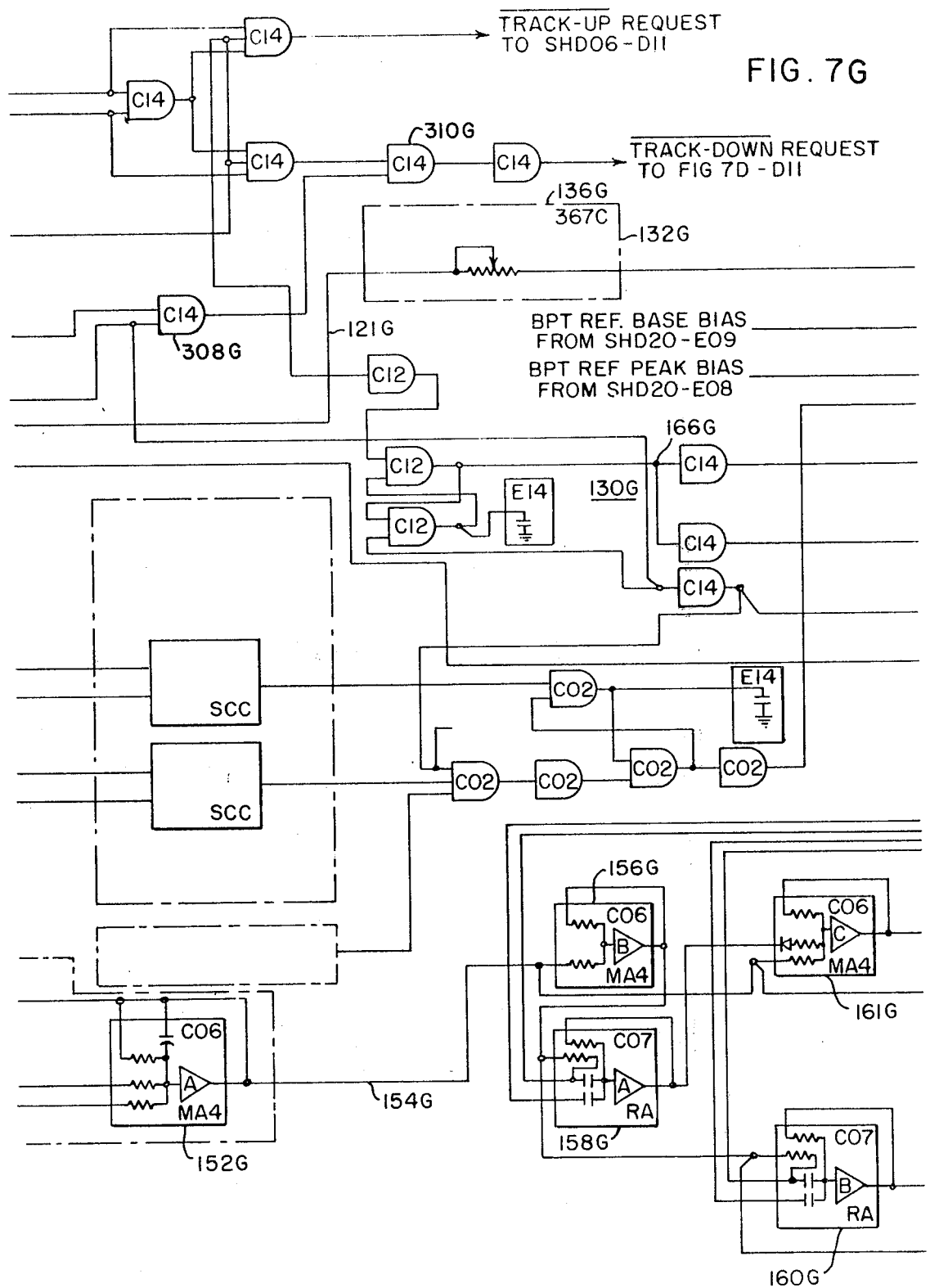

As shown in FIGS. 7F–7H, the surge limit is generated by an amplifier circuit 348G and a fuel cutback signal is generated by AND block 350G (FIG. 7H) when the surge limit is reached and the fuel is to be cut back. The surge cutback signal is implemented through the lower AND block 270G (FIG. 7B) at the same time that the raise AND block 266G is logically disabled by the cutback signal. Thus, on surge cutback, the startup ramp operation is interrupted and the turbine fuel is cut back by the NHC card 112G.

What is claimed is:

1. A combined cycle electric power plant comprising at least one gas turbine, means for generating steam in response to heat energy from said gas turbine, a steam turbine driven by steam supplied to it from said steam generating means, means for generating electric power under the driving power of said turbines, means for controlling the operation of said turbines and said steam generating means, said controlling means including a gas turbine control system having an automatic control and a backup control, said gas turbine control system including means for controlling the flow of fuel to said gas turbine under automatic and backup control, means for transferring between said automatic and backup controls under predetermined conditions, said backup control including means for manually raising and lowering a fuel demand signal applied to said fuel control means at least to control gas turbine load during the load mode of operation, means for limiting the operation of said fuel flow controlling means to limit the turbine outlet gas temperature, and circuit means for generating a feed-forward startup signal which increases as a function of time and which is applied to said fuel flow controlling means to provide for turbine acceleration normally without operation of said temperature limiting means to a speed at which synchronization control is to occur.

2. A combined cycle electric power plant as set forth in claim 1 wherein means are provided for generating a signal representative of gas turbine speed, and said startup signal generating means responds to said speed signal generating means to generate the feedforward startup signal according to a first curve over one speed range and according to a second curve over another speed range.

3. A combined cycle electric power plant as set forth in claim 1 wherein said automatic control includes a digital computer and said transferring means includes a hybrid interface circuit for generating a fuel demand signal bumplessly during transfers between the backup and automatic control modes for application to said fuel controlling means.

4. A combined cycle electric power plant as set forth in claim 2 wherein the first curve is a first linear ramp of fuel demand versus time and the second curve is a second linear ramp of fuel demand versus time with a different slope from that of the first curve.

5. A combined cycle electric power plant as set forth in claim 2 wherein a breaker is provided for a generator driven by the gas turbine and wherein means are provided for generating a breaker status signal and said startup signal generating means is made operative when said breaker status signal generating means and said speed signal generating means indicate the breaker is open and the speed is below a predetermined value.

6. A combined cycle electric power plant as set forth in claim 2 wherein means are provided for overriding the startup control signal to avoid surge and exhaust overtemperature operation during startup in the backup mode of operation wherein said startup signal generating means starts the first curve signal at ignition and wherein means are provided for limiting the fuel demand signal to a minimum value during and just after ignition until the first curve signal exceeds the minimum value.

7. A gas turbine electric power plant comprising a compressor section and a turbine section, a plurality of combustors for energizing the driving gas flow for the turbine section, means for generating electric power under the driving power of the turbine, a gas turbine control system having an automatic control and a backup control, means afor controlling the flow of fuel to said gas turbine under automatic and backup control, means for transferring between said automatic and backup controls under predetermined conditions, said backup control including means for manually raising and lowering a fuel demand signal applied to said fuel control means at least to control gas turbine load during the load mode of operation, means for limiting the operation of said fuel flow controlling means to limit the turbine outlet gas temperature, circuit means for generating a feedforward startup signal which increases as a function of time and which is applied to said fuel flow controlling means to provide for turbine acceleration without operation of said temperature limiting means to a speed at which synchronization control is to occur, means for generating a signal representative of gas turbine speed, and said startup signal generating means responding to said speed signal generating means to generate the feedforward startup signal according to a first curve over one speed range and according to a second curve over another speed range.

8. A gas turbine electric power plant as set forth in claim 7 wherein the first curve is a first linear ramp of fuel demand versus time and the second curve is a second linear ramp of fuel demand versus time with a different slope than that of the first curve.

9. A control system for an electric power plant gas turbine comprising an automatic control and a backup control, means for controlling the flow of fuel to said gas turbine under automatic and backup control, means for transferring between automatic and backup controls under predetermined conditions, said backup control including means for manually raising and lowering a fuel demand signal applied to said fuel control means at least to control gas turbine load during the load mode of operation, means for limiting the operation of said fuel flow controlling means to limit the turbine outlet gas temperature, circuit means for generating a feedforward startup signal which increases as a function of time and which is applied to said fuel flow controlling means to provide for turbine acceleration without operation of said temperature limiting means to a speed at which synchronization control is to occur, means for generating a signal representative of gas turbine speed, and said startup signal generating means responding to said speed signal generating means to generate the feedforward startup signal according to a first curve over one speed range and according to a second curve over another speed range.

10. A control system as set forth in claim 9 wherein said manual raising and lowering means include means for generating raise and lower signals for application to said interface circuit, said temperature limiting means includes means for generating a temperature override signal, and a logic circuit is provided for uncoupling the raise and lower signals from said fuel controlling means and for coupling the temperature override control signal to said fuel controlling means under overtemperature conditions.

* * * * *